US008449659B2

(12) United States Patent
Taylor et al.

(10) Patent No.: US 8,449,659 B2
(45) Date of Patent: May 28, 2013

(54) LIQUID DEGASSING MEMBRANE CONTACTORS, COMPONENTS, SYSTEMS AND RELATED METHODS

(75) Inventors: Gareth P. Taylor, Indian Trail, NC (US); Elmer Wayne Bouldin, Jr., Fort Mills, SC (US); Timothy D. Price, Monroe, NC (US); Tony R. Vido, Mount Holly, NC (US)

(73) Assignee: Celgard LLC, Charlotte, NC (US)

( * ) Notice: Subject to any disclaimer, the term of this patent is extended or adjusted under 35 U.S.C. 154(b) by 0 days.

(21) Appl. No.: 13/247,213

(22) Filed: Sep. 28, 2011

(65) Prior Publication Data

US 2012/0247337 A1    Oct. 4, 2012

Related U.S. Application Data

(60) Provisional application No. 61/387,292, filed on Sep. 28, 2010.

(51) Int. Cl.
*B01D 53/22* (2006.01)
*B01D 19/00* (2006.01)
*B01D 63/02* (2006.01)

(52) U.S. Cl.
USPC .................................. 96/6; 96/4; 96/8; 95/46

(58) Field of Classification Search
USPC .............. 96/4, 6, 8, 10; 95/45, 46; 210/321.8, 210/321.88, 321.89
See application file for complete search history.

(56) References Cited

U.S. PATENT DOCUMENTS

| | | | |
|---|---|---|---|
| 4,207,192 A | 6/1980 | Coplan et al. | |
| 4,636,307 A | 1/1987 | Inoue et al. | |
| 4,865,736 A * | 9/1989 | Coplan | ............................... 96/8 |
| 5,264,171 A | 11/1993 | Prasad et al. | |
| 5,352,361 A * | 10/1994 | Prasad et al. | ............. 210/321.81 |
| 5,366,625 A | 11/1994 | Pedersen et al. | |
| 5,922,201 A | 7/1999 | Yamamori et al. | |
| 5,938,922 A | 8/1999 | Fulk et al. | |
| 6,224,763 B1 | 5/2001 | Fend et al. | |
| 7,255,729 B2 * | 8/2007 | Yamada et al. | ..................... 96/8 |
| 2003/0154856 A1* | 8/2003 | Anderson | ........................ 96/8 |
| 2005/0161388 A1* | 7/2005 | Williams et al. | ................... 96/8 |
| 2005/0218064 A1* | 10/2005 | Sengupta et al. | .................. 96/8 |
| 2006/0163140 A1* | 7/2006 | Taylor et al. | ....................... 96/8 |
| 2007/0144716 A1* | 6/2007 | Doh et al. | ..................... 165/158 |
| 2009/0084720 A1 | 4/2009 | Dannenmaier et al. | |
| 2009/0301967 A1 | 12/2009 | Taylor et al. | |
| 2011/0036240 A1* | 2/2011 | Taylor et al. | ....................... 96/6 |

FOREIGN PATENT DOCUMENTS

JP      62-250908 A    10/1987

* cited by examiner

*Primary Examiner* — Jason M Greene
(74) *Attorney, Agent, or Firm* — Hammer & Associates, P.C.

(57) ABSTRACT

The present invention is directed to contactors, modules, components, systems, and/or methods of manufacture, and/or methods of use including degassing liquids. The contactor or module is integrally potted, has planar, disc shaped end caps, and a cylindrical housing or shell receiving and supporting a membrane structure. Each of the planar disc shaped end caps has a central opening therein adapted to receive a liquid end port or nozzle and is held in place in the housing or shell by at least one retaining element. The integrally potted membrane structure is preferably potted in place in the housing or shell by an inverted potting process involving the use of a removable plunger or plug to recess the potting.

17 Claims, 21 Drawing Sheets

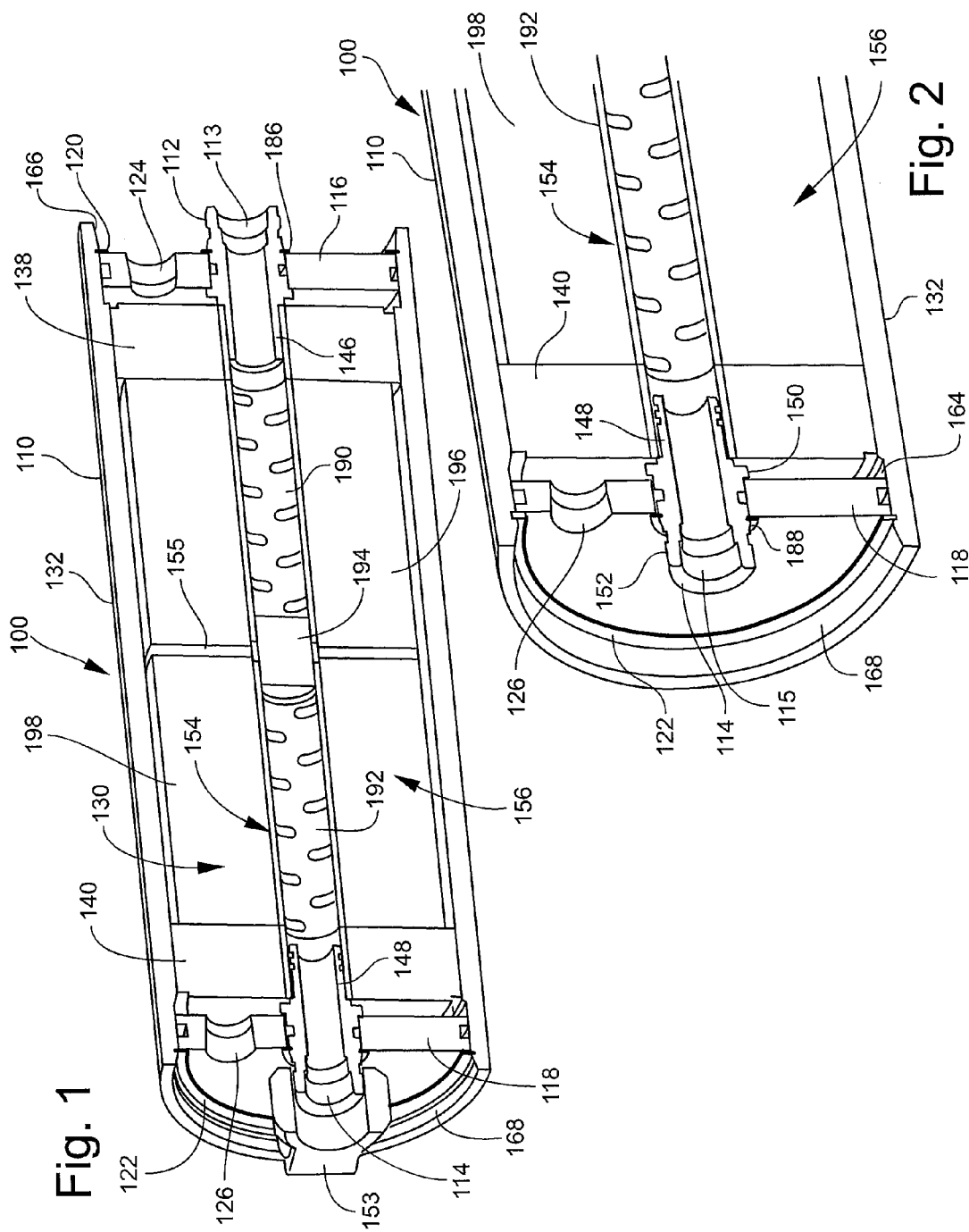

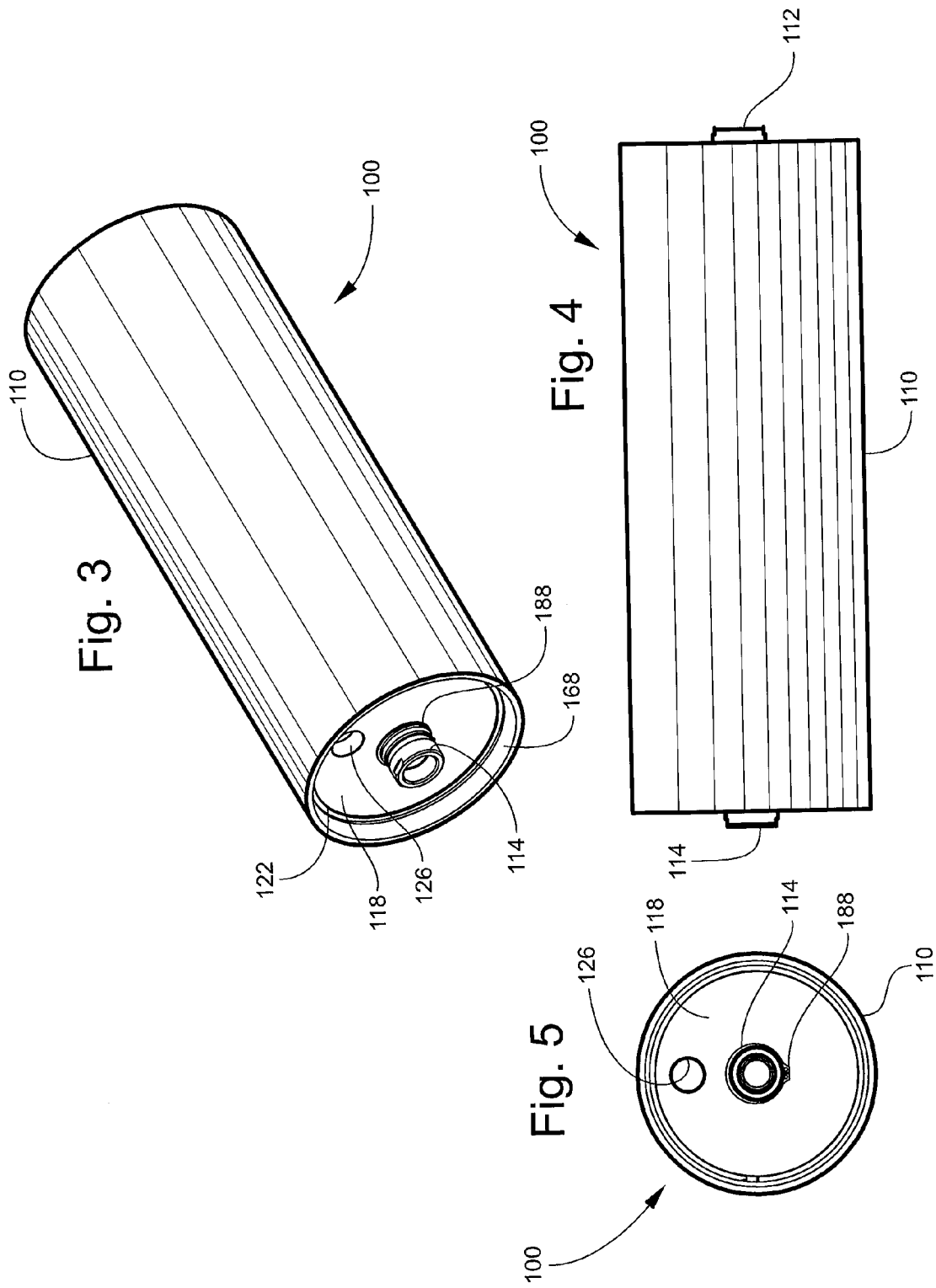

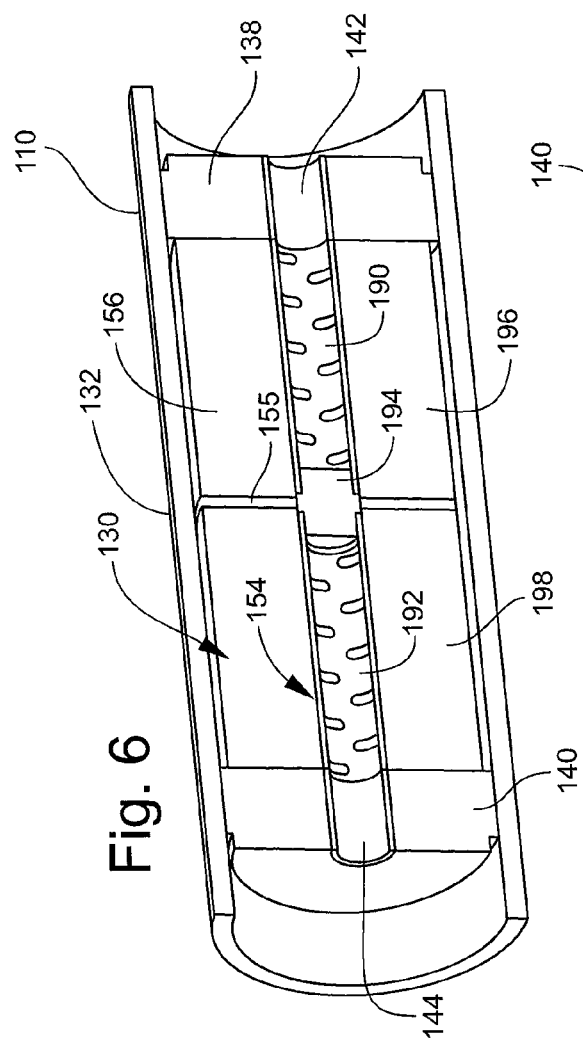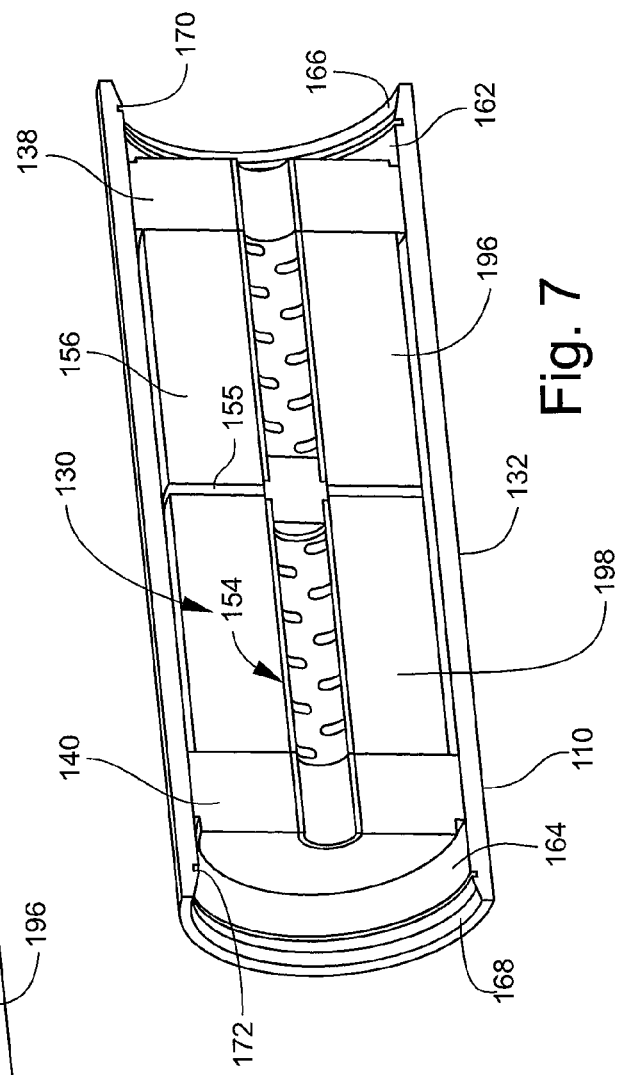

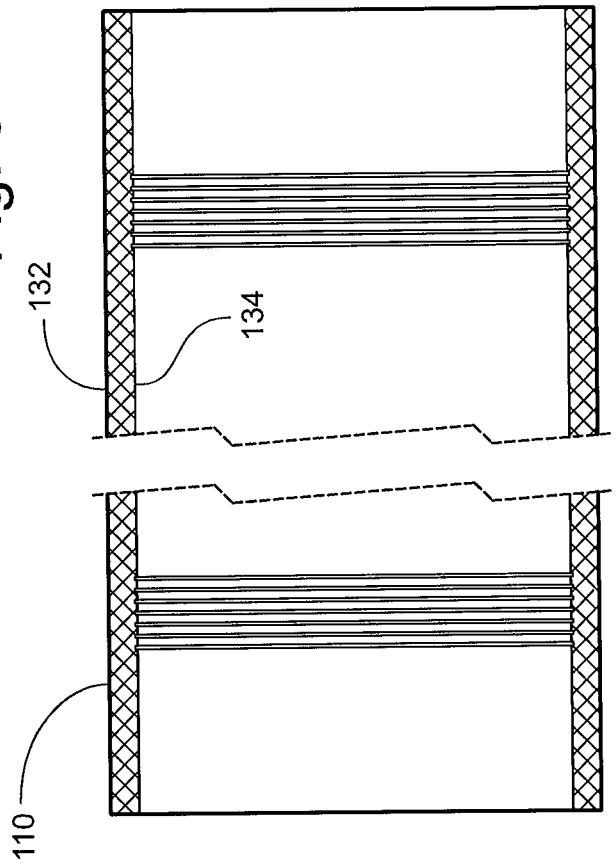
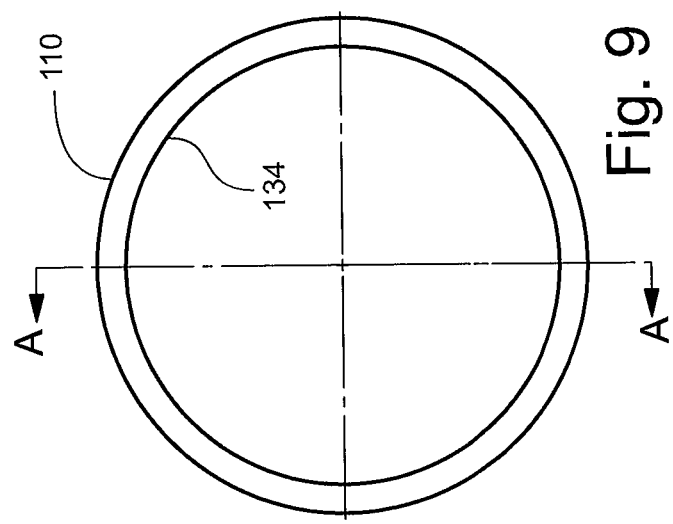

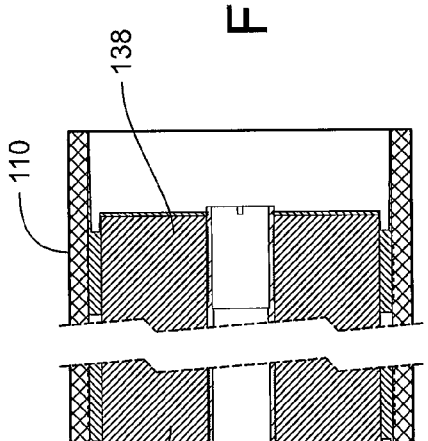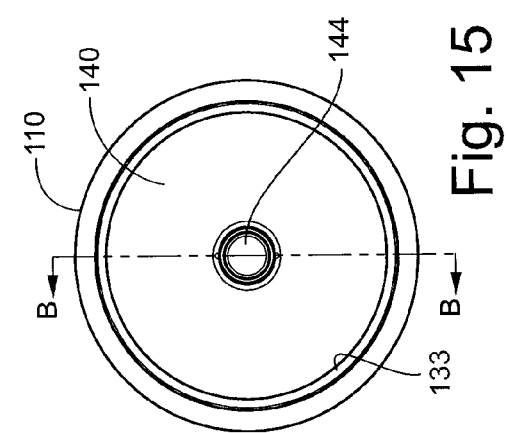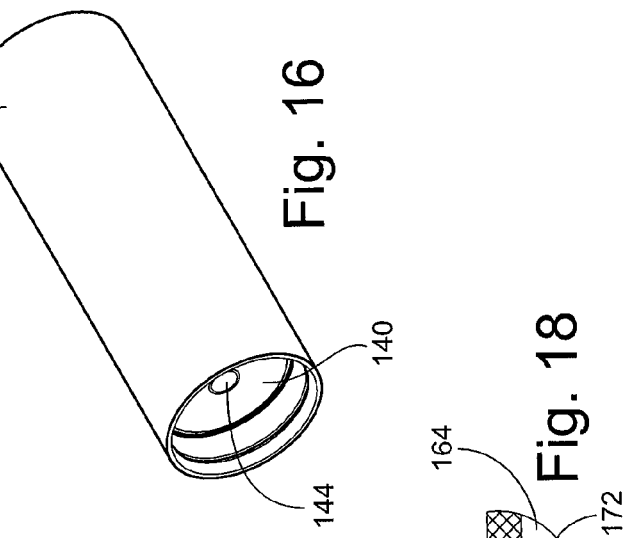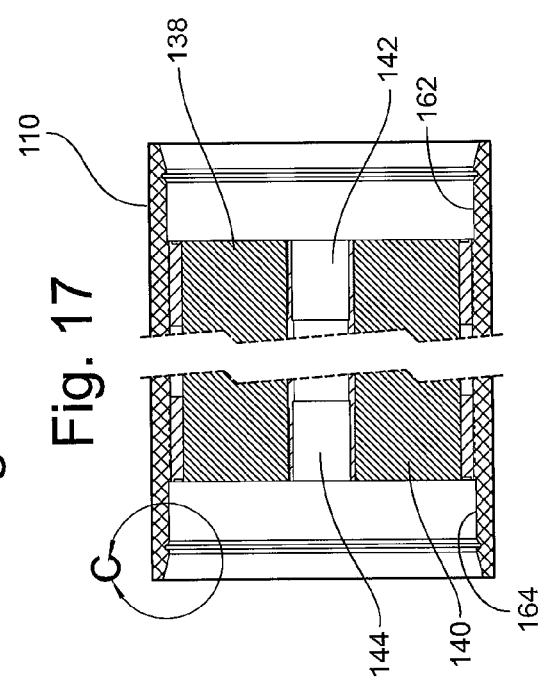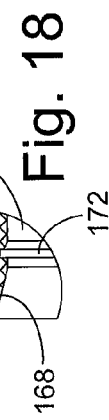

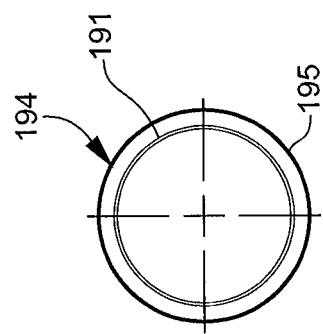
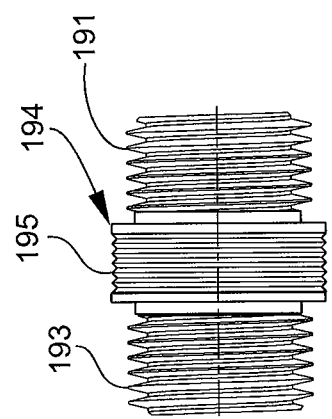

LIQUID DEGASSING MEMBRANE CONTACTORS, COMPONENTS, SYSTEMS AND RELATED METHODS

CROSS-REFERENCE TO RELATED APPLICATIONS

The present application claims priority to and the benefit of U.S. provisional patent application Ser. No. 61/387,292, filed Sep. 28, 2010, to Taylor et al., which is hereby fully incorporated by reference herein.

FIELD OF THE INVENTION

The instant application relates to membrane contactors or modules and their methods of manufacture and use. In at least selected embodiments, the present invention is directed to liquid degassing membrane contactors or modules and/or their methods of manufacture and/or use. In accordance with at least selected embodiments, examples or aspects, the present invention is directed to liquid degassing membrane contactors, components, systems, and/or their methods of manufacture and/or methods of use thereof. In at least certain embodiments, the present invention is directed to degassing a liquid having entrained or dissolved gases with a hollow fiber membrane contactor or module. In at least particular possibly preferred embodiments, the contactor or module is integrally potted, has planar, disc shaped end caps, and a cylindrical housing or shell receiving and supporting a membrane structure including a perforated core, a plurality of hollow fiber membranes, a tube sheet or potting affixing each end of the hollow fibers and adhering to the interior of the housing or shell. In at least particular possibly preferred embodiments, each of the planar disc shaped end caps has a central opening therein adapted to receive a liquid end port or nozzle, another opening therein adapted to receive a gas end port or threaded pipe, and is adapted to be held in place in said cylindrical housing or shell by at least one retaining element such as a retaining or locking ring received in a groove in the interior of the cylindrical housing or shell. In at least particular possibly preferred embodiments, the integrally potted membrane structure is potted in place in the housing or shell by an inverted potting process involving the use of a removable plunger or plug to recess the potting and then trimming the ends of the potting and opening the ends of the hollow fibers preferably using an internal lathe means.

BACKGROUND OF THE INVENTION

A membrane contactor may be used for many purposes, including but not limited to, removing entrained gases from liquids, debubbling liquids, filtering liquids, and adding a gas to a liquid. Membrane contactors are known to be used in many different applications, for example, a membrane contactor may be used in removing entrained gases from inks used in printing.

Membrane contactors may also provide a means of accomplishing gas/liquid, and liquid/liquid (which can encompass liquid/dissolved solid) separations. Membrane contactors typically are used to bring two immiscible fluid phases—for example, a first liquid and a second liquid, or a gas and a liquid—into contact with one another to effect separation and/or transfer of one or more components from one fluid to the other.

A hollow fiber membrane contactor typically includes a bundle of microporous hollow fibers, and a rigid shell or housing enclosing the fiber bundle. The shell may be provided with four fluid ports: an inlet for introducing the first fluid, an outlet for discharging the first fluid, an inlet for introducing the second fluid, and an outlet for discharging the second fluid. The hollow fibers may be potted on both ends, within the housing, to form polymeric tube sheets with the fiber bores opening on each end into common first and second end cap portions of the shell. In a "tube-side" or "lumen-side" contactor, the first end cap may contain the inlet for the first fluid, which is designated the "tube-side" or "lumen-side" fluid because it is the fluid that passes through the internal lumens of the fibers. The second end cap contains the outlet for discharging the lumen-side fluid. The second fluid, designated the "shell-side" fluid, typically enters and exits the housing through inlet and outlet ports arranged between the tube sheets, whereby the shell-side fluid contacts the external surfaces of the fibers. The shell-side fluid flows through the interstices between fibers of the fiber bundle, and may be directed to flow parallel or perpendicular to the fiber length. As an example, U.S. Pat. No. 5,352,361 to Prasad, et al., incorporated by reference herein in its entirety, may assist in a background understanding of fluid contact across hollow fiber membranes within a shell.

In a "shell-side" contactor, the contactor may include a central core which passes through the end caps and has a first end serving as the inlet for the first fluid, which is designated the "shell-side" fluid because it is the fluid that passes over the exterior or shell of the hollow fibers. The first end cap may contain the inlet for the second fluid, which is designated the "tube-side" or "lumen-side" fluid because it is the fluid that passes through the internal lumens of the fibers. The second end cap contains the outlet for discharging the lumen-side fluid. The first fluid, designated the "shell-side" fluid, typically enters and exits the housing through inlet and outlet ports (open ends) of the perforated core, and typically exits and re-enters the perforations in the core between the tube sheets whereby the shell-side fluid contacts the external surfaces of the fibers. The shell-side fluid flows through the interstices between fibers of the fiber bundle, and may be directed to flow parallel or perpendicular to the fiber length.

Because the tube sheets separate the lumen-side fluid from the shell-side fluid, the lumen-side fluid does not mix with the shell-side fluid, and the only transfer between the lumen-side fluid and the shell-side fluid occurs through the walls of the hollow fibers. The fine pores in the fiber wall are normally filled with a stationary layer of one of the two fluids, the other fluid being excluded from the pores due to surface tension and/or pressure differential effects. Mass transfer and separation are usually caused by diffusion, which is typically driven by the difference in concentration of the transferring species between the two phases. Typically, no convective or bulk flow occurs across the membrane.

In the case of gas/liquid separations, membrane contactors are typically fabricated with hydrophobic hollow fiber microporous membranes. Since the membranes are hydrophobic and have very small pores, liquid will not easily pass through the pores. As such, the membranes act as an inert support that brings the liquid and gas phases into direct contact, without dispersion. The mass transfer between the two phases is governed by the difference in partial pressure of the gas species being transferred.

For liquid systems, the liquid/liquid interface at each pore is typically immobilized by the appropriate selection of membrane and liquid phase pressures. In this case, the membrane also acts as an inert support to facilitate direct contacting of two immiscible phases without mixing.

Such known membrane contactors can be utilized for a variety of applications, including the separation of a component from a fluid or transferring a component of one fluid to another. For example, a membrane contactor can be used in removal of contaminants from an effluent stream. In many industrial processes, a contaminated effluent stream is generated as a by-product. In view of environmental concerns, and/or efforts to improve process efficiency, it is often desirable to remove one or more contaminants from the effluent stream so that the contaminant does not pollute the environment, negatively effect equipment, or so that it may be recycled. Existing industrial processes frequently must be upgraded to reduce environmental emissions and/or increase efficiency. Therefore, a need often arises for a process and system that can be economically retrofit to an existing plant to reduce emissions, protect equipment, recycle, or improve efficiency.

Several factors are important in the design of membrane contactors, including separation characteristics, cost, pressure drop, weight, and efficiency. The pressure drop across a contactor should be low to reduce the need for more expensive high pressure equipment, for additional pumps, or the like. Low pressure drop may be of particular importance in retrofit projects where a membrane contactor is to be added at the discharge point of an effluent process stream, as the process pressure at this point is typically at or near atmospheric pressure. High efficiency of mass transfer is desirable for reducing the size of the contactor. Low weight is desirable for decreasing installation and maintenance costs, and may be of particular importance in offshore applications. At least certain existing membrane contactors have been found less than fully satisfactory in meeting these goals, for particular applications, for extreme conditions, or the like. For example, the shell portion of typical membrane contactors adds considerably to their weight and expense. Shell-type contactors also typically must operate at elevated pressures. Accordingly, a need exists for a new or improved membrane contactor having improved characteristics over known membrane contactors, for use in particular applications, for use in extreme conditions, having a reduced cost, and/or the like. It is to the provision of a microporous hollow fiber membrane device and/or method addressing and/or meeting these and/or other needs, issues or problems that at least selected embodiments of the present invention may be directed.

Baffled membrane contactors capable of separating fluids are known, for example, see U.S. Pat. Nos. 5,264,171; 5,352,361; and 5,938,922, each of which is incorporated herein by reference in its entirety. At least certain of such contactors may include a perforated center tube, a plurality of hollow fibers surrounding the tube, tube sheets affixing the ends of the hollow fibers, a baffle located between the tube sheets, and a shell surrounding the tube, fibers, tube sheets, and baffle. Other than as disclosed in the U.S. Pat. No. 5,938,922 patent, the fibers are usually open at the baffle so that there is fluid communication through the hollow fiber lumen from one tube sheet to the other. The U.S. Pat. No. 5,938,922 discloses having the fibers closed at the baffle to prevent fluid communication through the hollow fiber lumen near the midpoint of the fibers between the tube sheets.

Such contactors capable of separating fluids, for example, dissolved gas from water, have numerous industrial applications. Those applications include: rust prevention systems for boilers or power plant turbines; rust prevention systems for drinking water, cooling water, or hot water pipe lines; ultra-pure water sources for the electronics industry (e.g., rinsing semiconductor wafers during manufacture); ultrasonic cleaning processes; water sources for food processing; and the like.

Two of the foregoing applications may be of particular interest. They are rust prevention in water pipe lines and ultra-pure water sources for the electronics industry. In each application, the removal of dissolved oxygen from water is extremely important. In rust prevention in water pipe lines, the oxygen reacts with dissolved iron or iron from the pipe line to form rust that may precipitate. In potable water, the rust precipitate is unattractive and causes staining; and in pipe lines, it can cause occlusion of the pipe. In ultra-pure water for the electronics industry, water is used to rinse semiconductor wafers during manufacture. Dissolved oxygen in the rinse water can etch the surface of the wafer and destroy it; it can also coat the wafer surface and prevent effective rinsing. Accordingly, the removal of dissolved gasses from water may be extremely important.

Therefore, there is a need to develop new or improved contactors, modules and/or systems for the degassing of liquids.

Also, current designs of membrane contactors are effective for some applications, but may have certain issues or limitations related to, for example, the degassing of high flow rate liquids and/or high pressure liquids, such as water at about 50 gpm or more and/or at about 100 psi or more, high pressure ratings, ASME code ratings, customer familiarity and acceptance, high cost, high weight, use of metal or other corrosive materials, modularity, replaceable self contained cartridges, porting options, module size, module array size, high pressure cartridges, excessively long fibers, liquid flow rates, gas concentration variation, do not allow for commercial production, require bolts or v-band clamps, do not have a cylindrical shape, and/or the like.

High flow rate, high pressure membrane contactors have long been the subject of interest to membrane developers. For example, selected gas transfer membrane contactors developed and manufactured by the Liqui-Cel business of Membrana-Charlotte a division of Celgard, LLC of Charlotte, N.C. can handle high flow rate (up to 400 gpm) and high pressure (up to 100 psi) liquids.

With the exception of the recent use of, for example, Liqui-Cel® Extra-Flow™ membrane contactor systems, most large scale industrial degasification systems still utilize very large vacuum towers to degasify water, seawater, and the like. For example, power plants and offshore oil rigs typically use large vacuum towers (30 feet tall or more) to degass water, process water, storage tank water, seawater, salt water, or the like.

A new or improved liquid degassing membrane contactor or module may allow for relatively small, modular, degassing modules to be used in industrial processes, at power plants, on offshore oil rigs or drilling platforms, to replace or augment vacuum towers, to provide the benefits of modularity and replaceable cartridges, reduce cost, reduce complexity, eliminate bolts or v-band clamps, and/or the like. Accordingly, there is a need for a new or an improved liquid degassing membrane contactor or module, and/or methods of manufacture and/or use thereof, a new or improved high pressure liquid degassing membrane contactor or module, and/or methods of manufacture and/or use thereof, a new or improved high pressure liquid degassing system, and/or the like.

SUMMARY OF THE INVENTION

In accordance with at least selected embodiments, examples or aspects, the instant invention addresses and/or meets the above needs and/or other needs, issues or problems, and is directed to, relates to, or provides for a new or improved process and system that can be economically retrofit to an existing plant to reduce emissions, protect equipment, recycle, or improve efficiency; a new or improved membrane contactor having improved characteristics over known membrane contactors, for use in particular applications, for use in extreme conditions, having a reduced cost, reduced complexity, and/or the like; a new or improved microporous hollow fiber membrane device and/or method; a new or improved method for the removal of dissolved gasses from water; new or improved contactors, modules and/or systems for the degassing of liquids; new or improved designs of membrane contactors effective for the degassing of high flow rate liquids and/or high pressure liquids, such as water at about 50 gpm or more and/or at about 100 psi or more, having high pressure ratings, ASME code ratings, customer familiarity and acceptance, low cost, low weight, limited use of metal or other corrosive materials, modularity, replaceable self contained cartridges or modules, porting options, smaller module size, compact module array, high pressure cartridges or modules, not excessively long fibers, that allow for commercial production, that do not require bolts or v-band clamps, that have a cylindrical shape, and/or the like; high flow rate, high pressure membrane contactors; new or improved liquid degassing membrane contactors or modules that allow for relatively small, modular, degassing modules to be used in industrial processes, at power plants, on offshore oil rigs or drilling platforms, to replace or augment vacuum towers, to provide the benefits of modularity and replaceable cartridges, reduce cost, reduce complexity, eliminate bolts or v-band clamps, and/or the like; new or improved liquid degassing membrane contactor or module, and/or methods of manufacture and/or use thereof; a new or improved high pressure liquid degassing membrane contactor or module, and/or methods of manufacture and/or use thereof; a new or improved high pressure liquid degassing system and/or method; and/or the like.

In accordance with at least selected embodiments, examples or aspects, the instant invention relates to membrane contactors or modules and their methods of manufacture and use. In at least selected preferred embodiments, the present invention is directed to liquid degassing membrane contactors or modules and/or their methods of manufacture and/or use. In accordance with at least selected embodiments, examples or aspects, the present invention is directed to new or improved liquid degassing membrane contactors, components, systems, and/or their methods of manufacture and/or methods of use thereof. In at least certain embodiments, the present invention is directed to contactors, modules, systems, and/or methods of degassing liquids having entrained or dissolved gases with one or more hollow fiber membrane contactors or modules. In at least particular possibly preferred embodiments, the contactor or module is integrally potted, has planar, disc shaped end caps, and a cylindrical housing or shell receiving and supporting a membrane structure including a perforated core, a plurality of hollow fiber membranes, a tube sheet or potting affixing each end of the hollow fibers and adhering to the interior of the housing or shell. In at least particular possibly preferred embodiments, each of the planar disc shaped end caps has a central opening therein adapted to receive a liquid end port or nozzle, another opening therein adapted to receive a gas end port or threaded pipe, and is adapted to be held in place in said cylindrical housing or shell by at least one retaining element such as a retaining or locking ring received in a groove in the interior of the cylindrical housing or shell. In at least particular possibly preferred embodiments, the integrally potted membrane structure is potted in place in the housing or shell by an inverted potting process involving the use of a removable plunger or plug to recess the potting and trimming the ends of the potting and opening the ends of the hollow fibers preferably using an internal lathe means, and may also include machining or forming a larger diameter section for receiving the end cap, a groove for receiving the retaining ring, and a flared entrance for facilitating the insertion of the end cap and retaining ring preferably using an internal lathe means.

In accordance with at least selected embodiments, objects, examples or aspects, the present invention is directed to or provides: membrane contactors or modules and their methods of manufacture and use; liquid degassing membrane contactors or modules and/or their methods of manufacture and/or use; liquid degassing membrane contactors, components, systems, and/or their methods of manufacture and/or methods of use thereof; degassing a liquid having entrained or dissolved gases with a hollow fiber membrane contactor or module; a contactor or module that is integrally potted, has planar, disc shaped end caps, and a cylindrical housing or shell receiving and supporting a membrane structure including a perforated core, a plurality of hollow fiber membranes, a tube sheet or potting affixing each end of the hollow fibers and adhering to the interior of the housing or shell; planar disc shaped end caps each having a central opening therein adapted to receive a liquid end port or nozzle, having another opening therein adapted to receive a gas end port or threaded pipe, and adapted to be held in place in a cylindrical housing or shell by at least one retaining element such as a retaining or locking ring received in a groove in the interior of the cylindrical housing or shell; an integrally potted membrane structure being potted in place in the housing or shell by an inverted potting process involving the use of a removable plunger or plug to recess the potting and then trimming the ends of the potting and opening the ends of the hollow fibers preferably using an internal lathe means; and/or the like.

In at least particular possibly preferred embodiments, the contactor housing, shell, casing, or body is selected from standard PVC, ABS, polypropylene, steel, or stainless steel pipe (preferably a pipe material that will bond with epoxy to facilitate integral potting), such as 1" to 24" (nominal pipe size)(nominal diameter) standard PVC, ABS, steel, or stainless steel pipe, preferably 2" to 24" (nominal pipe size) Schedule 80 PVC pipe or 2" to 24" (nominal pipe size) Schedule 40 PVC pipe, more preferably 4" to 20" (nominal pipe size) Schedule 80 gray PVC pipe, and most preferably 6" to 18" (nominal pipe size) Schedule 80 gray PVC pipe.

At least certain prior contactors were made using membrane cartridges that were machined to have tube sheets or hollow fibers which ended flush with the end of the cartridge. In contrast, at least selected possibly preferred embodiments of the present invention have tube sheets and/or hollow fibers which end deeply recessed in the housing which required the development and use of a new process for trimming or cutting the potting, tube sheet, and/or fibers deeply recessed in the housing. In accordance with at least one possibly preferred embodiment of the present invention, the potting, tube sheets, and/or hollow fibers are deeply recessed in the housing by numerically controlled (NC) lathe machining such as lathe finish cutting with tapered blades.

In accordance with at least selected particular possibly preferred embodiments of the present invention, the housing is preferably an about 8" nominal pipe size Schedule 80 PVC pipe, the membrane is preferably integrally potted in the housing an inverted potting technique so the potting is recessed in the housing, the potting is preferably machined deeply recessed in the housing by, for example, numerically controlled (NC) lathe machining (preferably with no initial rough cut or additional finish cut operation), the contactor or module length is preferably easily shortened or extended by selecting shorter or longer housing lengths (for example with an 8" nominal diameter Schedule 80 PVC pipe as the housing, the housing length may be selected to be about 10" to 60", preferably about 20" to 50", more preferably about 24" to 36"), and/or the end caps are preferably pressed into place and held in position with retaining rings (no bolts or v-band clamps needed) and may be press installed with an Arbor Press.

In at least selected embodiments, the present invention is directed to pressurized liquid degassing membrane contactors and/or their methods of manufacture and/or use. In at least certain embodiments, the present invention is directed to degassing a high pressure liquid having one or more entrained or dissolved gases with a hollow fiber membrane contactor. Preferably, the contactor has a high pressure housing or shell enclosing at least one membrane element, preferably an integrally potted shell side liquid baffled membrane element, including a perforated core, a plurality of hollow fiber membranes, a tube sheet affixing each end of the hollow fibers, and a cylindrical housing, shell or casing. More preferably, lumens of the hollow fibers are in fluid communication with a sweep gas (a strip gas), a vacuum, or both, and the liquid to be degassed (or debubbled) enters the contactor via an open end of the perforated core and radially exits through the core perforations, crosses over the exterior of the hollow fibers (the shell side or shellside), optionally passes over at least one baffle and crosses over the exterior of another portion of the hollow fibers, returns to the core through the perforations, and exits the contactor with less dissolved or entrained gas. The entrained or dissolved gas diffuses or passes from the liquid across the hollow fiber membrane and into the lumen.

In at least selected embodiments, the present invention is directed to liquid degassing membrane contactors having housings or shells that are preferably selected from standard PVC, ABS, polypropylene, steel, or stainless steel pipe (preferably a pipe material that will bond with epoxy to facilitate integral potting), such as 1" to 24" (nominal pipe size)(nominal diameter) standard PVC, ABS, steel, or stainless steel pipe, preferably 2" to 24" (nominal pipe size) Schedule 80 PVC pipe or 2" to 24" (nominal pipe size) Schedule 40 PVC pipe, more preferably 4" to 20" (nominal pipe size) Schedule 80 gray PVC pipe, and most preferably 6" to 18" (nominal pipe size) Schedule 80 gray PVC pipe. Such pipe section housings are preferably machined or modified to receive end caps and retaining rings. The end caps preferably include both liquid and gas (or permeate) end ports with the liquid ports preferably adapted to operate under pressure and the permeate or gas ports preferably adapted to function correctly under vacuum or reduced pressure conditions.

In at least certain embodiments, the present invention is directed to degassing a liquid having a dissolved or entrained gas or gases with a membrane contactor including one or more integrally potted hollow fiber membrane elements. Preferably, the contactor has at least one membrane element including a perforated core, a plurality of hollow fiber membranes, a tube sheet affixing each end of said hollow fibers, an optional baffle, nozzle means operatively connecting the core to the liquid being degassed, and gas port means operatively connecting the interior of the hollow fibers to the sweep gas, strip gas and/or vacuum. More preferably, the hollow fiber lumens are in fluid communication with a sweep gas (or strip gas), a vacuum, or both, and the liquid to be degassed (or debubbled) enters the contactor via an open end of the perforated core and radially exits the core perforations, crosses over the exterior of the membranes within the housing or shell, optionally passes over a baffle and crosses over the exterior of other portions of the membranes within the shell, re-enters the core through other perforations, and exits the contactor with less entrained or dissolved gas. As such, the contactor is a shell-side liquid contactor and the dissolved or entrained gas diffuses from the liquid across the membrane and into the lumen (and out through a side or end gas or vacuum port).

In accordance with at least selected embodiments of the present invention, the present new or improved membrane contactors, modules, systems, and/or methods address the drawbacks of prior contactors, are effective for some applications, are adapted for the degassing of high flow rate liquids and/or high pressure liquids, have high pressure ratings, have ASME code ratings, will have immediate customer familiarity and acceptance, are relatively lower cost, are relatively lower weight, do not use metal or other corrosive materials, do not use bolts or v-band clamps, have improved or standard housing module sizes, have improved module array sizes, have one or more high pressure contactors, do not have excessively long fibers, allow for commercial production, and/or the like.

In accordance with at least certain embodiments of the present invention, a new or improved liquid degassing membrane contactor allows for relatively small, modular, degassing modules to be used in industrial processes, at power plants, on offshore oil rigs or drilling platforms, to replace or augment vacuum towers, to provide the benefits of modularity and replaceability, and/or the like. Accordingly, at least certain embodiments of the present invention provide a new or improved liquid degassing membrane contactor which addresses the need for a new or improved liquid degassing membrane contactor, module, system, and/or methods of manufacture and/or use thereof.

In accordance with at least selected embodiments of the present invention, an improved liquid degassing membrane contactor or module includes a housing of a length or section of standard size pipe and at least one degassing element therein. It may be preferred that the housing is a standard high pressure pipe (preferably machined, retrofitted or modified to receive and retain end caps), made of, for example, PVC, ABS, polypropylene, steel, stainless steel, or the like with pipe pressure ratings of, for example, 100, 150, 200, or 250 psi or higher and with an end cap at each end, and an integrally potted shell side liquid degassing membrane element, structure or unit therein.

In accordance with at least selected embodiments of the present invention, it is preferred that the liquid degassing contactor operate, for example, at shellside liquid pressures of about 5 to 200 psig, preferably 10 to 100 psig, more preferably 10 to 90 psig, and most preferably 10 to 60 psig, and at lumenside gas vacuum or pressures of minus 14.7 psig to about positive 60 psig, preferably minus 14.7 psig to positive 30 psig, more preferably minus 10 psig to positive 15 psig, most preferably at about a minus 5 psig (to clarify terminology: psi=pounds per square inch, psig=pounds per square inch gauge, psia=pounds per square inch absolute, psig=psia+14.7 psi, 14.7 psia=normal atmospheric pressure, −14.7 psig=0 psia=lowest possible negative pressure or absolute vacuum).

In at least one embodiment, such an integrally potted liquid membrane element may include a perforated center tube, a first mat comprising a plurality of first hollow fiber membranes each having a first end and a second end both being open, an optional baffle separating the hollow fiber mat into two areas, and potting at each end. The first and second membrane ends are open, for example, to allow strip or sweep gas to pass there through. It may be preferred that the baffle is formed of a center tube connector joining first and second sections of the center tube and by epoxy that is applied over the center tube connector in the center of the mat or bundle while winding forming a dam or block through the entire thickness of the hollow fiber mat. It may also be preferred that the potting be made of epoxy and that the ends of the potting be trimmed or cut off to form the open first and second fiber ends following potting.

In accordance with at least one embodiment, the center tube forms an opening in each end of the membrane element and is perforated along its length to provide for liquid to flow through the perforations or radial openings and over the hollow fibers. The center tube opening in each end of the membrane element is adapted to be in fluid communication with the respective liquid ports or nozzles in the end caps of the contactor. For example, one end of the nozzle may be used to connect the tube end openings with the nozzle or port.

In accordance with at least one embodiment, the preferred housing is a length or section of an 8" nominal diameter Schedule 80 PVC pipe.

In accordance with at least one embodiment, an array of two or more 8" diameter degassing modules is formed of modules including housings of a length or section of an 8" nominal diameter Schedule 80 PVC pipe.

Further, the present membrane contactors may offer a modular option for many applications and they can be put in virtually any area of a building. They may rapidly displace forced draft deaerators and vacuum towers in new systems as well as many older ones.

The present membrane contactors preferably use commercially available machineable materials (for example, PVC, ABS, steel, or stainless steel (SS) housings, Delrin, PVC, ABS, FRP, SS, Noryl, or steel end caps, epoxy potting, and polypropylene hollow fibers). The potting material is preferably epoxy, which is used in many other Liqui-Cel® products and has been proven in the field for years. Both of the preferred high performance Celgard® X40 and X50 microporous hydrophobic polypropylene hollow fibers are very cost effective for dissolved $CO_2$ and $O_2$ removal from water.

Such preferred devices may be clean enough to be used in the make up loop of a semiconductor plant. More specifically, they may be used to deoxygenate large make-up systems and to deoxygenate large water streams used in TFT plants. Additionally, they may offer a solution for removing carbon dioxide ($CO_2$) prior to mixed bed or EDI technology to eliminate or reduce chemical usage and improve water quality exiting these technologies. They may also be used in boiler feed water applications for oxygen ($O_2$) removal to protect the boiler and piping from corrosion. In the boiler application, they may also have lower operating costs because blow down frequency is reduced and less energy is required for the contactor system operation.

The preferred changes made to materials, product design, use and replacement allow for more favorable economics of the preferred device for many large industrial and make-up applications. If purity and FDA compliance are important in the end use application, high-purity 8×20 or 8×40 membrane contactor embodiments are available for those end uses.

In accordance with at least selected possibly preferred embodiments, the present membrane contactors (or modules) utilize thousands of Celgard® microporous polyolefin (PO) hollow fibers, such as hydrophobic polypropylene (PP) or polymethyl pentene (PMP, or poly(4-methyl-1-pentene)), or hollow fibers made of polyvinylidene fluoride (PVDF), microporous hydrophobic PVDF, copolymers of polyvinylidene fluoride, such as a copolymer of polyvinylidene fluoride and hexafluoropropylene (PVDF:HFP), other polyolefins (e.g., polyethylene, polybutene), polysulfones (e.g., polysulfone, polyethersulfone, polyarylsulfone), cellulose and its derivations, poly phenyl oxide (PPO), PFAA, PTFE, other fluorinated polymers, polyamides, polyether imides (PEI), polyimides, polyamideimides, and/or the like, knitted into an array that is wound around a distribution tube with a central baffle. During preferred operation, the liquid flows over the shell side or shellside (outside) of the hollow fibers. The preferred design incorporates a baffle in the middle of the hollow fiber bundle in the contactor (or cartridge), which directs the liquid radially across the array. A strip gas or vacuum, either separately or in combination, is applied on the lumen side or lumenside (inside) of the hollow fibers.

Because of its hydrophobic nature, the membrane acts as an inert support to allow direct contact between a gas and liquid phase without dispersion. The dissolved gas in the liquid travels through the pore by applying a higher pressure to the liquid stream relative to the gas stream.

The membrane contactors of the present invention may be used around the world for adding or removing oxygen ($O_2$), carbon dioxide ($CO_2$) and nitrogen ($N_2$) to or from different liquids in the Semiconductor, Power, Pharmaceutical, Photographic, Food and Beverage, and many other industries. Such contactors may also be used to add gasses to liquids to enhance megasonic cleaning. The beverage industry looks to membrane contactors for carbonation, nitrogenation and $O_2$ removal. These reflect only a few examples of the variety of applications where the present membrane contactors may be used.

Additionally, Membrana-Charlotte offers liquid ring vacuum pumps, eductors and Orbisphere sensors to complement such membrane contactors.

At least selected embodiments of the present invention are directed to degassing a liquid with a membrane contactor. A liquid having a dissolved gas is introduced into a contactor which is connected to a strip gas and/or vacuum source. The contactor (or system or array of multiple contactors) preferably has a perforated core, a plurality of hollow fiber membranes, a tube sheet affixing each end of the fibers, and a shell having gas and liquid openings. The shell encloses the fibers, the tube sheets, and the core. The hollow fiber lumens are in fluid communication with the strip gas and/or vacuum source. Liquid enters the contactor via the core's open end, radially exits the core, crosses over the membranes within the shell, re-enters the core, and exits the contactor (or module). The dissolved gas thereby diffuses from the liquid across the membrane into the lumen. The degassed or debubbled liquid exiting the contactor or contactor array may have a dissolved gas content (or residual $O_2$) of less than 100 ppb, preferably less than 50 ppb, more preferably less than 20 ppb.

In accordance with certain embodiments of the invention, there are provided a novel contactor, contactor array and/or a system for degassing a liquid including one or more such contactors or arrays.

In accordance with at least one embodiment of the invention, the contactor includes a perforated core, a plurality of microporous hollow fibers, and a shell, housing or casing. The fibers surround the core and have two ends. A tube sheet affixes the ends of the fibers. A baffle is located between the tube sheets. The hollow fibers are one of open or closed at the baffle. The shell, housing or casing encloses the fibers, tube sheets, and the baffle.

In accordance with at least another embodiment of the invention, a system for degassing liquids includes a source of liquid containing a gas, a source of vacuum, and at least one contactor including a perforated core, a plurality of microporous hollow fibers, a baffle, and a shell, housing or casing. The source of liquid is in fluid communication with one end of the core. The source of vacuum is in fluid communication with the lumens of the hollow fibers through the tube sheets. The liquid passes out of the core, across the fibers, around the baffle, across the fibers, and back into the core.

In accordance with at least one object of the invention, there are provided new or improved spiral-type hollow fiber membrane fabric-containing contactors and modules containing flow-directing baffles, for separations and other phase contact applications.

It is another object of at least selected embodiments of this invention to provide such contactors and modules in which flow-directing baffles are axially positioned to promote radial flow of fluids throughout the hollow fiber bundle.

It is yet another object of at least certain embodiments this invention to provide such contactors and modules in which feed fluid flow is intermittently directed near to and/or through a portion of the core, and subsequently out to the periphery of the bundle.

It is still another object of at least particular embodiments this invention to provide a number of contactor and module designs yielding radial feed fluid flow patterns which can be selected for particular desired membrane contact regimes.

It is an additional object of at least certain embodiments this invention to provide methods for constructing the improved contactors and/or modules.

Further objects may be set forth in the discussion below.

At least certain embodiments the present invention are directed to degassing a liquid such as water with a series or parallel array or system of a plurality of high pressure membrane contactors. A liquid having a dissolved gas is introduced into the contactors of the array or system and the contactors are connected to a sweep gas, strip gas, and/or vacuum source. Preferably, each contactor has at least one membrane element including a perforated core, a plurality of hollow fiber membranes, a tube sheet affixing each end of said fibers, and a cylindrical housing or shell. The shell substantially encloses the fibers, the tube sheet, and the core. More preferably, the hollow fiber lumens are in fluid communication with the sweep gas, strip gas, and/or vacuum source. Liquid enters the contactor via a nozzle connected to the core's open end, radially exits the core, crosses over the membranes within the shell, flows around at least one baffle, and exits the contactor via another nozzle connected to the core's other open end. The dissolved gas thereby diffuses from the liquid across the membrane into the lumen. The liquid exiting the array or system of a plurality of high pressure membrane contactors may have a dissolved gas content of less than 10 ppb. The array or system of a plurality of high pressure membrane contactors is preferably a skid mounted or pallet mounted mobile array of at least three high pressure membrane contactors each having a high pressure housing or shell and at least one membrane element integrally potted therein. The preferred array or system has a plurality of such high pressure membrane contactors.

Although the preferred membrane contactor or module is used for liquid degassing, the membrane contactors of the present invention may be used for many purposes, including but not limited to: removing entrained gases from liquids, debubbling liquids, filtering liquids, and/or adding a gas to a liquid; as means of accomplishing gas/liquid, and/or liquid/liquid (which can encompass liquid/dissolved solid) separations; to bring two immiscible fluid phases—for example, a first liquid and a second liquid, or a gas and a liquid-into contact with one another to effect separation and/or transfer of one or more components from one fluid to the other; and/or the like.

The preferred hollow fiber membrane contactor may include a bundle of microporous hollow fibers, and a rigid shell or housing enclosing the fiber bundle. The shell or housing may be provided with four fluid ports: an inlet for introducing the first fluid, an outlet for discharging the first fluid, an inlet for introducing the second fluid, and an outlet for discharging the second fluid. The hollow fibers are preferably potted on both ends, within the shell or housing, to form polymeric tube sheets with the fiber bores opening on each end into common first and second end cap portions of the shell or housing.

According to at least selected embodiments of the invention, improvements are provided in a spiral-type hollow fiber membrane fabric-containing module or contactor, comprising:

1) A module housing or shell formed of a modified section of standard pipe;

2) A pair of end caps adapted to fit in the ends of said module housing;

3) Liquid end ports in each of said end caps;

4) At least one gas port in at least one of said end caps (or in the side of said module housing near one end thereof);

5) At least one membrane element integrally potted in said module housing, and comprising:

a. a plurality of hollow fiber membranes each having a lumen, said membranes being formed into a fabric-like array in which the hollow fibers substantially are mutually-parallel and constitute the fabric weft, and are held in spaced-apart relationship by filaments constituting the fabric warp;

b. the array being wound upon an axis which is substantially parallel to the hollow fibers into a spirally-wound membrane bundle having two bundle ends and a cylindrical exterior surface;

c. each of the two bundle ends being potted in resinous potting material serving to seal the bundle end into an adjacent monolithic tube sheet, a portion of the bundle between the two tube sheets being free from potting material to form a shell-side region, and the lumen ends of the hollow fibers constituting a first one of the bundle ends being exposed and communicating with the exterior of the bundle;

d. the module shell, casing or housing having first and second housing ends and a cylindrical housing interior and being suitably shaped to contain the membrane bundle, the tube sheet (potting) adjacent but recessed inwardly from the first housing end sealing the first bundle end to the cylindrical housing interior, said module housing which contains the bundle defining two regions mutually communicating through the membrane including (i) a shell-side space exterior to the portion of the bundle between the tube sheets and within the housing, and (ii) a lumen-side space including the hollow fiber lumens and the first bundle end;

6) Wherein an interior face of a first of said end caps and an interior of said module housing adjacent the first membrane bundle end, together with the cylindrical housing interior and the first bundle end, seal a first module housing end and define a first chamber communicating with the membrane lumens;

7) Wherein an interior face of a second of said end caps and an interior of said module housing adjacent a second membrane bundle end, together with the cylindrical housing interior and the second bundle end, seal a second module housing end and define a second chamber communicating with the membrane lumens;

8) said liquid ends ports being operatively connected to the shell-side space of said membrane, and arranged to permit fluid injection and withdrawal there through; and 9) the at least one gas port communicating with at least one of the first and second chambers, and arranged to permit gas injection and withdrawal there through.

The above improved spiral-type hollow fiber membrane fabric-containing module or contactor, further comprising:

1) At least two gas ports with one gas port in each of at least each of said end caps or in each side of said module housing near each end thereof.

The above improved spiral-type hollow fiber membrane fabric-containing module or contactor, further comprising:

1) At least two such modules forming an array or system.

The above improved spiral-type hollow fiber membrane fabric-containing module or contactor, further comprising:

1) a hollow mandrel in said membrane having a longitudinal axis and a cylindrical exterior surface, an axial bore, and perforations along the surface which communicate with the bore.

The above improved spiral-type hollow fiber membrane fabric-containing module or contactor, further comprising:

1) both of the lumen ends of the hollow fibers are exposed and communicate with the exterior of the bundle.

The above improved spiral-type hollow fiber membrane fabric-containing module or contactor, further comprising:

1) wherein said module housing is a length of modified standard pipe such as a length of 8" nominal diameter Schedule 80 PVC pipe.

The above improved spiral-type hollow fiber membrane fabric-containing module or contactor, further comprising:

1) wherein the module housing and end caps will contain and restrain the membrane should it fail.

At least selected embodiments of the invention also provide methods for the manufacture and/or use of the above spiral-type hollow fiber membrane fabric-containing modules and/or cartridges.

In accordance with at least selected embodiments of the invention, at least certain objects provide contactors or modules effective for some applications, adapted for the degassing of high flow rate liquids and/or high pressure liquids, having high pressure ratings, having ASME code ratings, having customer familiarity and acceptance, having lower cost, having lower weight, not using metal or other corrosive materials, having modularity, having porting options, having different module sizes, having different module array sizes, not having excessively long fibers, having high liquid flow rates, allowing for commercial production, and/or the like.

In accordance with at least selected embodiments of the invention, at least certain objects provide non-metallic, modular, high flow rate, low, medium or high pressure membrane contactors that have long been the subject of interest to membrane developers, that can replace or augment large vacuum towers to degasify water, seawater, and the like (for example, at power plants, on offshore oil rigs, or the like to degas water, process water, storage tank water, seawater, salt water, or the like).

In accordance with at least selected embodiments of the invention, at least certain objects provide an improved liquid degassing membrane contactor that allows for relatively small, modular, degassing modules to be used in industrial processes, at power plants, on offshore oil rigs or drilling platforms, to replace or augment vacuum towers, to provide the benefits of modularity and replaceable cartridges, and/or provide an improved liquid degassing membrane contactor, and/or methods of manufacture and/or use thereof, and/or the like.

The instant application relates to membrane contactors or modules and their methods of manufacture and use. In at least selected embodiments, the present invention is directed to liquid degassing membrane contactors or modules and/or their methods of manufacture and/or use. In at least certain embodiments, the present invention is directed to degassing a high pressure liquid having entrained or dissolved gases with a hollow fiber membrane contactor or module. In at least particular possibly preferred embodiments, the contactor or module is integrally potted, has planar, disc shaped end caps, and a high pressure cylindrical housing or shell receiving and supporting an integrally potted membrane structure including a perforated core, a plurality of hollow fiber membranes, a tube sheet or potting affixing each end of the hollow fibers and adhering to the interior of the housing or shell. In at least particular possibly preferred embodiments, each of the planar disc shaped end caps has a central opening therein adapted to receive an end port or nozzle and being held in place in said cylindrical housing or shell by at least one retaining element such as a retaining or locking ring received in a machined groove in the interior of the cylindrical housing or shell. In at least particular possibly preferred embodiments, the integrally potted membrane structure is potted in place in the housing or shell by an inverted potting process involving the use of a removable plunger or plug and trimming the ends of the potting and opening the ends of the hollow fibers recessed in the housing preferably using an internal lathe means.

Further embodiments and/or the various embodiments may be described or detailed in the discussion below, and defined in the appended claims.

BRIEF DESCRIPTION OF THE DRAWINGS

For the purpose of illustrating the embodiments, examples or aspects of the invention, there is shown in the drawings a form that is presently possibly preferred; it being understood, however, that the present invention is not limited to the precise embodiments, aspects, arrangements, and/or instrumentalities shown.

FIG. 1 is a schematic longitudinal cross-sectional illustration of an exemplary module or contactor of at least one embodiment of the instant invention;

FIG. 2 is an enlarged partial schematic longitudinal cross-sectional illustration of the module or contactor of FIG. 1;

FIG. 3 is a perspective view illustration of the module or contactor of FIG. 1;

FIG. 4 is a side view illustration of the module or contactor of FIGS. 1 and 3;

FIG. 5 is an end view of the module or contactor of FIGS. 1 and 3;

FIG. 6 is a schematic longitudinal cross-sectional illustration of an exemplary potted precursor or intermediate during a first phase of production in accordance with an exemplary production process of at least one embodiment of the instant invention;

FIG. 7 is a schematic longitudinal cross-sectional illustration of an exemplary machined precursor or intermediate during a second phase of production in accordance with the exemplary production process of FIG. 6;

FIG. 8 is a schematic longitudinal cross-sectional illustration of the exemplary module housing or shell of FIGS. 1 and 3 in accordance with at least one embodiment of the instant invention;

FIG. 9 is an end view of the housing of FIG. 8;

FIG. 12 is a cross section of the nozzle of FIG. 13 taken along line A-A in FIG. 13;

FIGS. 14 and 15 are respective cross section and end views of the potted precursor of FIG. 6, and FIG. 14 is a cross section of the potted precursor of FIG. 15 taken along line B-B in FIG. 15;

FIGS. 16, 17 and 18 are respective perspective, cross section and partial enlarged views of the machined precursor of FIG. 7, and FIG. 18 is an enlarged view of the portion of the housing indicated by line C in FIG. 17;

FIG. 19 is a cross section of the end cap of FIG. 20 taken along line D-D in FIG. 20;

FIGS. 25 and 26 are respective side and end views of the exemplary solid center tube connector adapted to join two center tube sections as shown in FIGS. 1 and 23;

DETAILED DESCRIPTION OF THE INVENTION

Figure 10:
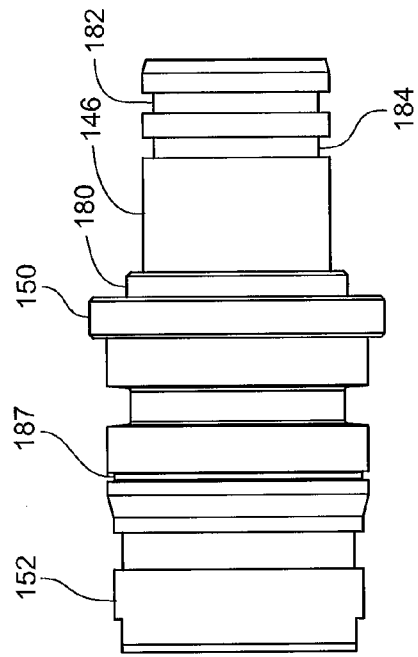
FIG. 10 is a schematic perspective view illustration of the exemplary nozzle or liquid port component of FIGS. 1 and 3 in accordance with at least one embodiment of the instant invention.
Figure 11:
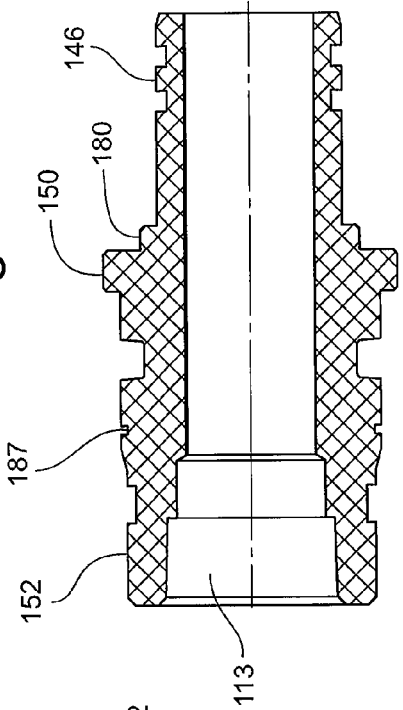
FIGS. 11, 12 and 13 are respective side, cross section and end views of the nozzle of FIG. 10.
Figure 13:
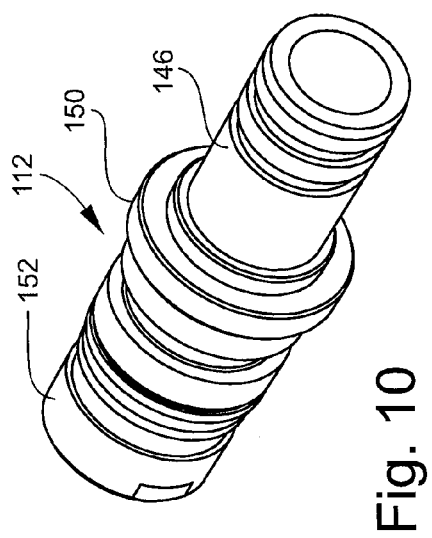

Referring to the drawings wherein like numerals indicate like elements, there is shown, in FIG. 1, one embodiment of a module or contactor 100, such as a liquid degassing membrane contactor, of at least one embodiment of the present invention. Module 100 includes a cylindrical housing or vessel 110, central end ports or nozzles 112, 114, end caps 116, 118, end cap locks 120, 122, and end ports or openings 124, 126 (such as 1" NPT openings adapted to receive a threaded end of a 1" pipe). Most preferably, the module is adapted for liquid degassing, and the end ports or nozzles 112, 114 are liquid ports adapted to preferably respectively receive liquid to be degassed, debubbled, or the like or to discharge degassed or debubbled liquid depending on the direction of liquid flow through the device 100, and end ports or openings 124, 126 are gas ports adapted to preferably respectively receive, discharge, remove, or be connected to at least one of a sweep gas, strip gas, vacuum (to be connected to a vacuum source or pump), or the like (see for example, FIGS. 30 to 32) to facilitate removal or control of the entrained or dissolved gas or gases.

Although it may be less preferred than the above, the module 100 may be adapted for adding one or more gases to the liquid, and the central end ports or nozzles 112, 114 may respectively be liquid ports to receive liquid to be treated or modified or to discharge the treated liquid, and gas ports or openings 124, 126 may be gas ports to respectively receive or remove carbon dioxide, nitrogen, and/or the like, to be connected to a gas source or pump, or the like, to facilitate the control or addition of a gas or gases.

Although it may be still less preferred than above, the module 100 may be adapted for controlling or adding humidity to a gas or air stream, and the end ports or nozzles 112, 114 may be liquid ports to receive water, and end ports or openings 124, 126 may be gas ports to respectively receive and remove sweep gas, strip gas, air, or the like, and/or for one or both to be connected to vacuum (to be connected to a vacuum source or pump) to facilitate the creation, addition, removal, and/or control of water vapor, humidity, or the like.

Although it may be yet less preferred than above, the end ports or nozzles 112, 114 may be gas ports, and end ports or openings 124, 126 may be liquid ports. Although it may be still yet less preferred, the end ports 112, 114 may be liquid ports, and end ports 124, 126 may be liquid ports, or the end ports 112, 114 may be gas ports, and end ports 124, 126 may also be gas ports.

For at least certain applications, the preferred arrangement may be a countercurrent flow of liquid and gas. For example, liquid may flow from port 112 to port 114 while gas flows from port 126 to port 124, or liquid may flow from port 114 to port 112 while gas flows from port 124 to port 126. For at least certain other applications, the preferred arrangement may be a common direction flow of liquid and gas. For example, liquid may flow from port 112 to port 114 while gas flows from port 124 to port 126, or liquid may flow from port 114 to port 112 while gas flows from port 126 to port 124. For at least certain still other applications, the preferred arrangement may be flow of liquid from one liquid port to the other while gas is drawn out of both gas ports. For example, both gas ports 124 and 126 may be connected to vacuum (such as to a vacuum pump). For at least certain yet other applications, the preferred arrangement may be flow of liquid from one liquid port to the other while gas is forced into both gas ports. For example, both gas ports 124 and 126 may be connected to a source or supply of gas to be introduced into the liquid (such as for carbonation, nitrogenation, or the like).

Many industries have the need to remove, add or control dissolved gasses in liquids. Module or contactor 100 and similar membrane contactors as shown and described herein can be used in such industries where gasses need to be removed, controlled or added. In other words, there are many membrane degassing and gas transfer applications where the present liquid degasifiers could be used.

With reference to FIGS. 1 to 6, module 100 may include a membrane structure, element or unit 130 preferably including a central portion 132 of cylindrical shell, casing or housing 110, with an interior surface 134 (see FIGS. 8 and 9). Further, membrane structure 130 includes potting 138, 140 for sealing the ends of the structure 130 between the casing interior 134 and a center tube 154, for securing the ends of the hollow fibers, and for forming tube sheets. Potting 138, 140 has respective central end openings 142, 144 preferably defined by the interior of the center tube 154.

As shown in FIGS. 1, 2, and 10 to 13, module 100 preferably includes nozzles 112 and 114 including respective first ends 146, 148 adapted to mate with or fit in center tube openings 142, 144, a raised portion 150, and a second end 152 adapted to be received in opening 136 in end cap 118 and to mate with or receive a liquid source or supply such as a standard fitting or flange 153 (for example a 2" standard coupling such as shown in FIG. 1). Also, nozzles 112 and 114 may have, for example, 1" NPT openings to receive threaded ends of 1" pipes.

As shown in FIGS. 1, 2 and 6, membrane structure 130 also preferably includes the center tube 154, baffle 155 and membrane mat 156.

FIG. 1 shows exemplary module or contactor 100 to be a 4 port module having two central end or shell side ports or nozzles 112, 114 and two other end or lumen side ports or openings 124, 126. In accordance with a possibly most preferred embodiment, the housing or shell 110 is preferably a length or section of a standard pipe such as, for example, a 24" length of an 8" nominal diameter Schedule 80 PVC pipe, which is preferably modified or machined on each end to receive and retain therein an end cap 116, 118. For oil rig or off shore drilling platform degassing applications, it is preferred to use a non-metallic, corrosion resistant housing 110.

FIGS. 3, 4 and 5 show the module 100 of FIG. 1.

Preferably, housing or shell 110 of module 100 has an elongated constant diameter central opening portion 132 and enlarged diameter end portions 162, 164 (see FIGS. 1, 2, 7, and 16 to 19), flared ends 166, 168, and ring retaining grooves 170, 172. In accordance with at least one embodiment, the end caps 116, 118 are sealed in the openings 162, 164 by, for example, respective o-rings in grooves 119 in the end caps. Flared end openings 166, 168 are adapted to receive end caps 116, 118 and end cap locks or rings 120, 122 which fit in grooves 170, 172 to secure the end caps in position in the housing 110 with the end ports 112, 114 in position and being received by respective ends 142, 144 of center tube 154. The raised portion 150 and a shoulder 180 of nozzles 112, 114 limit the maximum that the respective ends 146, 148 can be inserted in the respective center tube openings 142, 144. Nozzle ends 146, 148 preferably also include, for example, o-ring grooves 182, 184 for receiving respective o-rings which form fluid tight seals with the ends of the center tube 154.

Further, nozzles 112, 114 are locked in position in the openings 136 in end caps 116, 118 by retaining or locking rings or clips 186, 188 received in respective grooves 187 in nozzles 112, 114.

As described above, the preferred module 100 has a very simple yet very effective construction. The shell side fluid or liquid is separated from the lumen side fluid or gas (except at the membrane interface). Preferably, standard materials and parts are used where possible. For example, standard o-rings and locking rings are used together with custom or modified parts such as the housing, end caps, nozzles, and center tubes. Depending on the module end use or application, different end ports, nozzles, side ports, and/or openings may need to be used.

Although the center tube 154 may be a single piece perforated pipe (with or without a center plug or flow restrictor), as shown in FIGS. 1, 6, 7, and 21 to 26, it is preferred that center tube 154 be made of at least three parts: a first perforated tube portion 190, a second perforated tube portion 192, and a solid tube connector 194. As shown, the tube connector 194 preferably has respective threaded ends 191 and 193 adapted to mate with internal threads in the ends of tubes 190 and 192 adjacent the connector 194. Also, tube connector 194 preferably has a raised central grooved portion 195 for spacing the tubes 190, 192 and for aiding in forming baffle 155 from, for example, epoxy, as the membrane mat or fabric is wrapped around tube 154, and to help the baffle 155 stay in position after being formed. Similarly, each of tubes 190, 192 may preferably include ribs or grooves 202 near the end opposite connector 194 for aiding in forming potting 138, 140 from, for example, epoxy, after the membrane mat or fabric is wrapped around tube 154 and placed in casing 132, and to help the potting 138, 140 stay in position after being formed. Preferably, each of the tubes 190, 192 has a smooth perforation free inner surface in the end adapted to receive respective ends 146, 148 of nozzles 112, 114.

Membrane mat 156 is preferably separated into two membrane portions 196 and 198 by baffle 155. For example, if liquid to be degassed is flowing through module 100 from end port 112 to end port 114, the liquid flows through the opening 113 in end port 112, through opening 142 in tube 190, out through perforations or openings 200 in tube 190, around, for example, the hollow fibers in membrane mat portion 196, over baffle 155 (between baffle 155 and casing interior 134), around, for example, the hollow fibers in membrane mat portion 198, through perforations or openings 200 in tube 192, through opening 144 in tube 192, and out through the opening 115 in nozzle 114. In this example, tube 190 is a liquid distribution tube and tube 192 is a liquid collection tube.

In another example, the liquid to be degassed is flowing through module 100 from end port 114 to end port 112, the liquid flows through opening 115 in end port 114, through opening 144 in tube 192, out through perforations or openings 200 in tube 192, around, for example, the hollow fibers in membrane mat portion 198, over baffle 155 (between baffle 155 and casing interior 134), around, for example, the hollow fibers in membrane mat portion 196, through perforations or openings 200 in tube 190, through opening 142 in tube 190, and out through opening 113 in end port 112. In this example, tube 192 is a liquid distribution tube and tube 190 is a liquid collection tube.

Although FIGS. 1, 6 and 7 show a single integrally potted membrane unit or structure in housing 110 of module 100, with a single baffle therein, it is contemplated that two or more such units, two or more baffles, other baffle configurations, no baffle, and/or the like may be used.

Although it is preferred to use one membrane unit having baffled membrane mats therein, it is understood that non-baffled or multiple baffle configurations could be used. For example, membrane mats of short modules may be non-baffled, while those of long modules may include two or more baffles.

With reference to FIGS. 27A-27D, there is schematically represented an exemplary press type process 300 for placing the retaining ring 120 or 122 in the respective groove 170 or 172 in housing 110 to lock the respective end cap 116 or 118 therein. As shown, a plunger 302 is used to press the ring 122 through flared opening 168 and into groove 172. The flared opening 168 helps to compress the ring 122 until it reaches groove 172 and can expand outwardly and lock in groove 172. The same process can be used for ring 120. Such retaining rings may typically be removed with a flat blade screwdriver if needed.

With reference to FIGS. 28A-28D, there is schematically represented an exemplary press type process 400 for placing the retaining ring 186 or 188 in the respective groove 187 in nozzle 112 or 114 to lock the respective nozzle and end cap 116 or 118 in position. As shown, a plunger 402 is used along with an adapter or installation cone 404 placed over the nozzle 114 to press the ring 188 over the conical upper portion 406 of cone 404 to spread the ring, push it down the side of adapter 404 and release it over and into groove 187 in nozzle 114. The conical portion 406 helps to expand the ring 188 so it fits over and down nozzle 114 until it reaches groove 187 and can contract inwardly and lock in groove 187. The same process can be used for ring 186. Such retaining rings may typically be removed with a flat blade screwdriver if needed.

It is contemplated that press type processes 300 and 400 can be combined to simultaneously place rings 122 and 188 in position. Such can be accomplished by using adapter 404 and combining plunger 402 with plunger 302. The same combined process can be used for rings 120 and 186 and may be accomplished with an Arbor Press.

With reference to FIGS. 1 to 5, it is noted that the contactors or modules 100 are preferably self contained membrane contactors, of a reasonable size and weight to be shipped, handled, installed, and replaced. Such contactors may make it easy to construct and to maintain systems or arrays of such modules. In accordance with a possibly preferred example, 8" nominal diameter contactors are 40" or less in length, and 16" diameter contactors are 20" or less in length.

Figure 12:
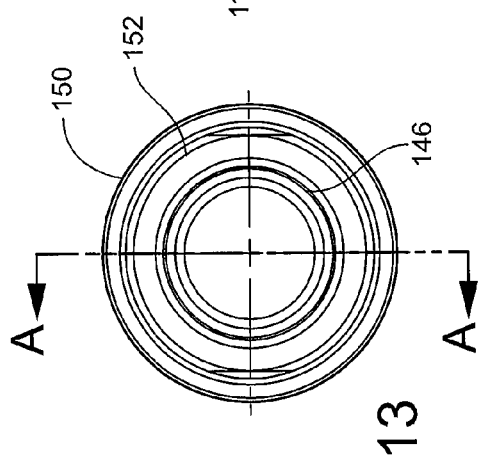
Figure 19:
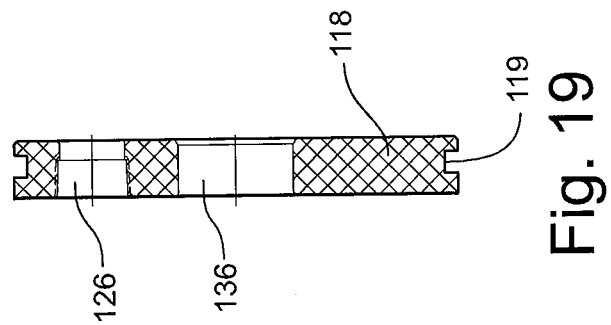
FIGS. 19 and 20 are respective cross-sectional and end view illustrations of the exemplary end cap or plate of FIGS. 1 and 3 in accordance with at least one embodiment of the present invention.
Figure 20:
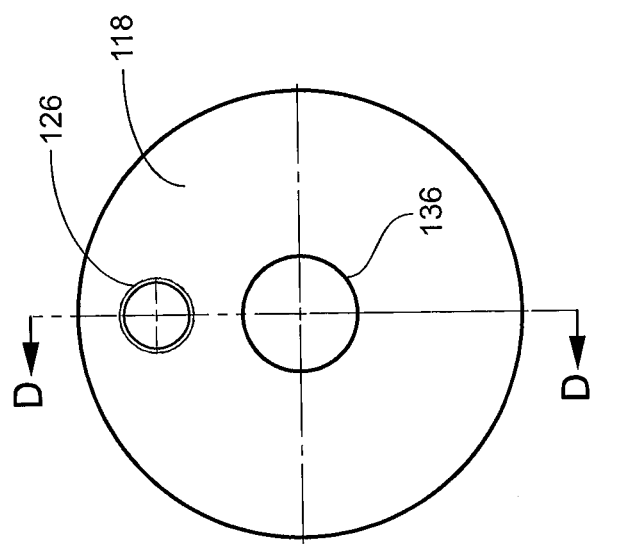
Figure 21:
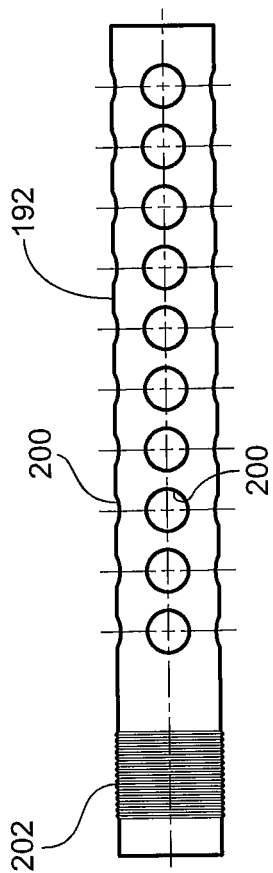
FIGS. 21 and 22 are respective side and end views of one half of at least one embodiment of the exemplary two piece center tube of FIGS. 1 and 6.
Figure 22:
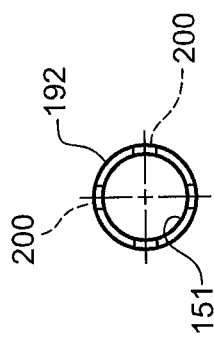
Figure 23:
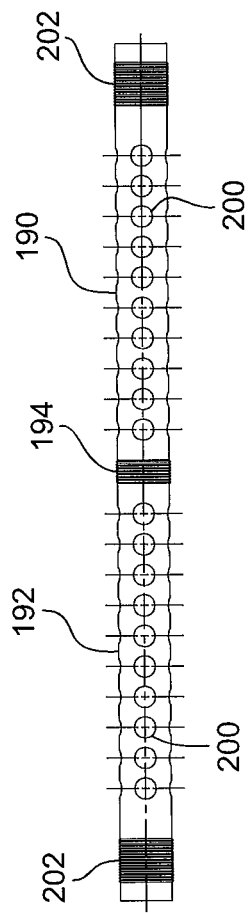
FIGS. 23 and 24 are respective side and end views of at least one embodiment of the exemplary assembled two piece center tube of FIGS. 1 and 6.
Figure 24:
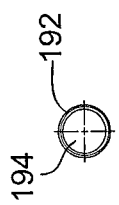
Figure 27D:
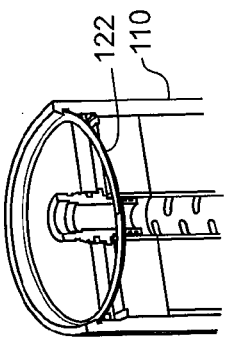
FIGS. 27A to 27D are respective schematic cross-sectional view illustrations of an exemplary process and equipment for inserting the end cap retaining ring in the housing of at least one embodiment of the instant invention.
Figure 27C:
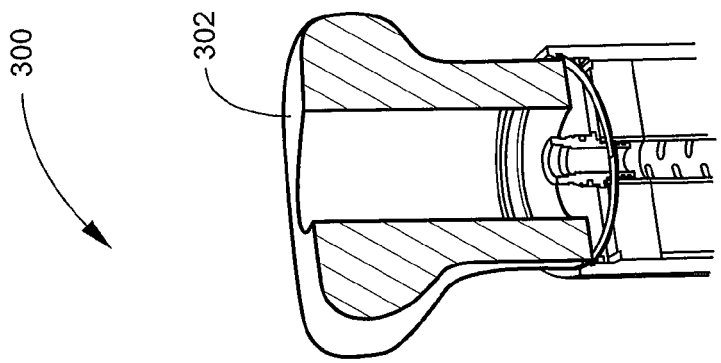
Figure 27B:
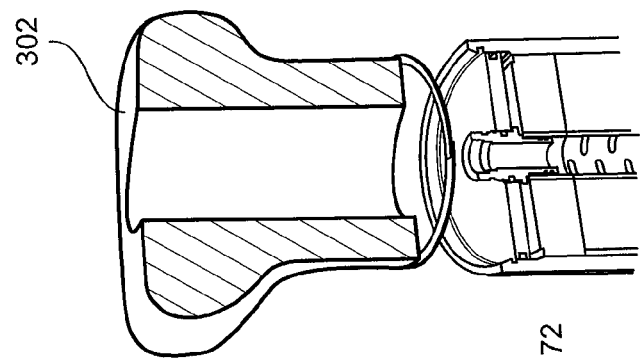
Figure 27A:
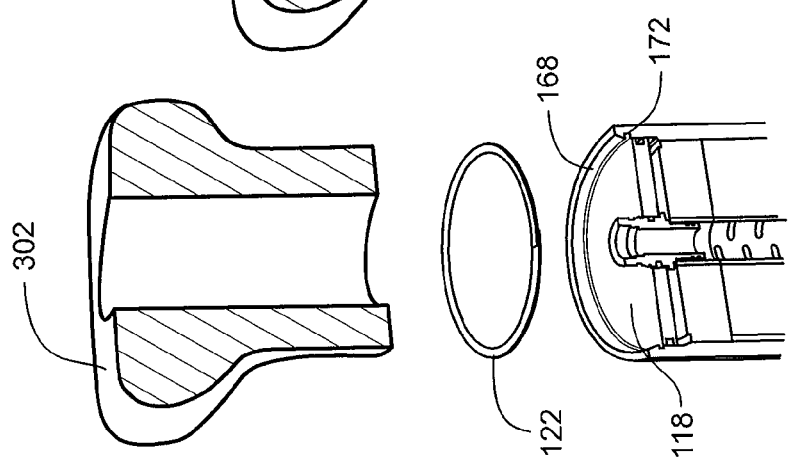
Figure 28A:
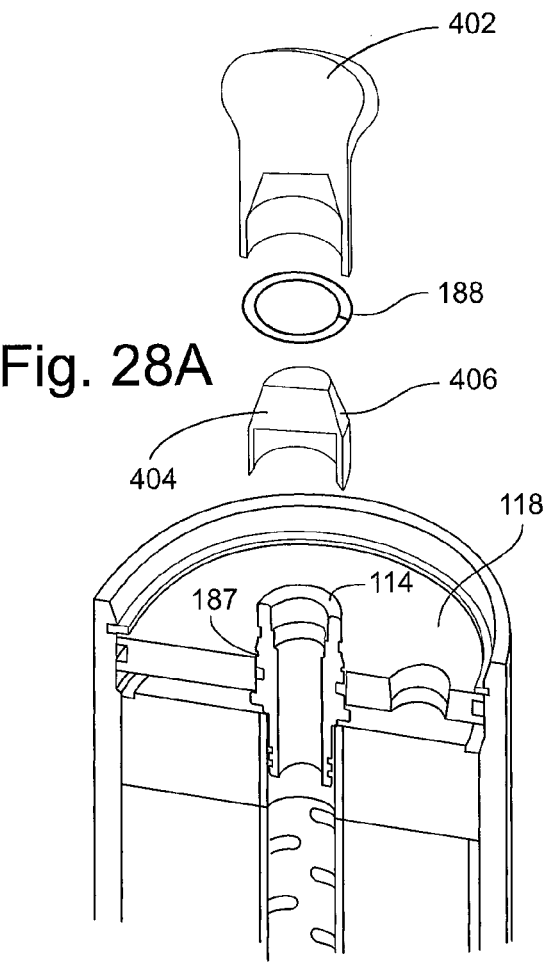
FIGS. 28A to 28D are respective schematic cross-sectional view illustrations of an exemplary process and equipment for placing the retaining clip on the nozzle of at least one embodiment of the instant invention.
Figure 28B:
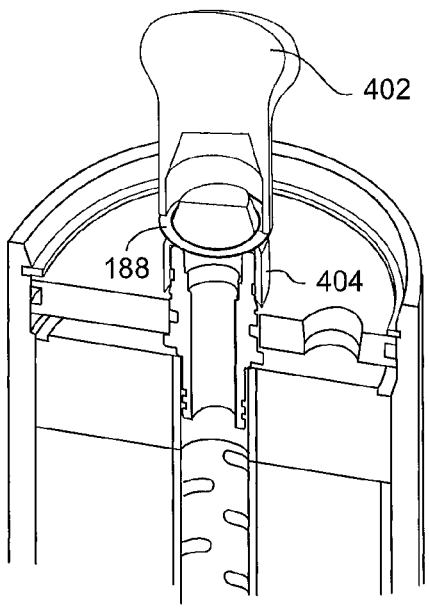
Figure 28C:
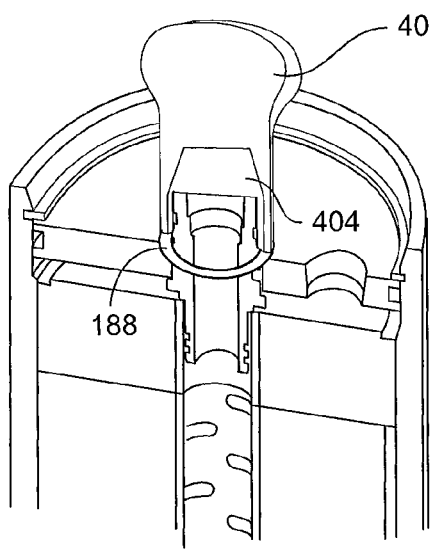
Figure 28D:
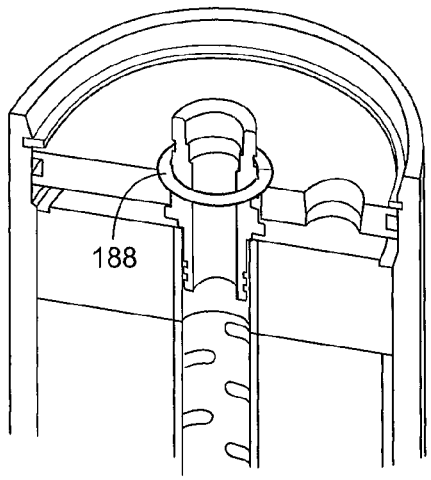

With reference to FIGS. 1, 2 and 12, the nozzles or ports 112, 114 each have a center opening 113, 115 providing for fluid flow there through.

Figure 29:
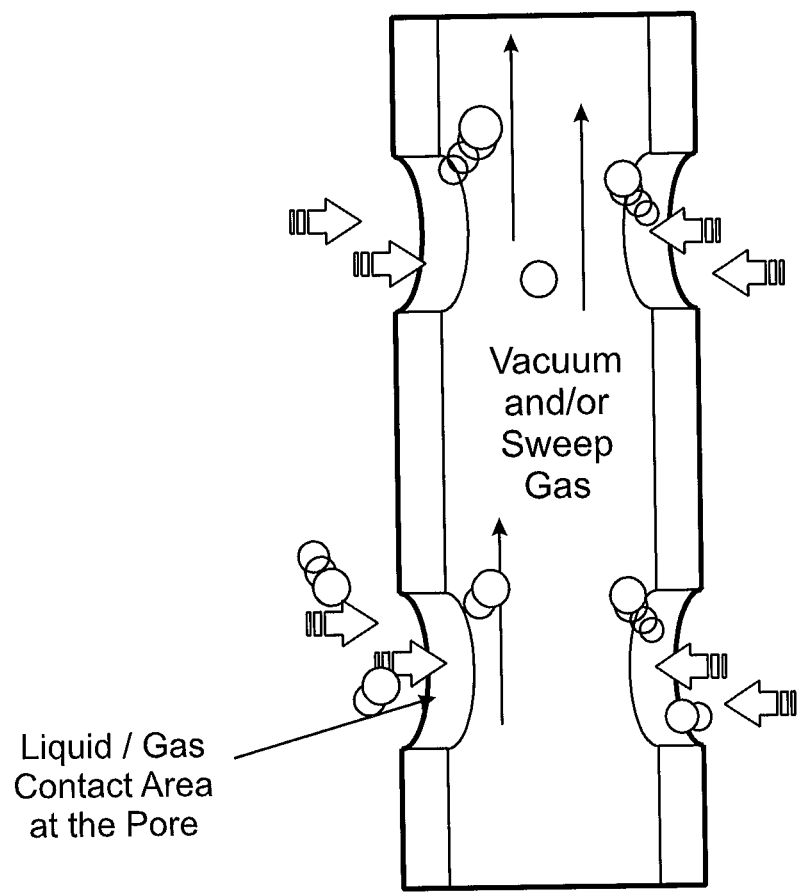
FIG. 29 is a schematic enlarged cross section illustration of gas transfer across a portion of a hollow fiber membrane.

With reference to FIG. 29, preferably for degassing a liquid such as water, the hollow fibers are hydrophobic microporous membranes having pores which block the passage of liquid but allow passage or transfer of gases and vapors.

Figures 30, 31, 32:
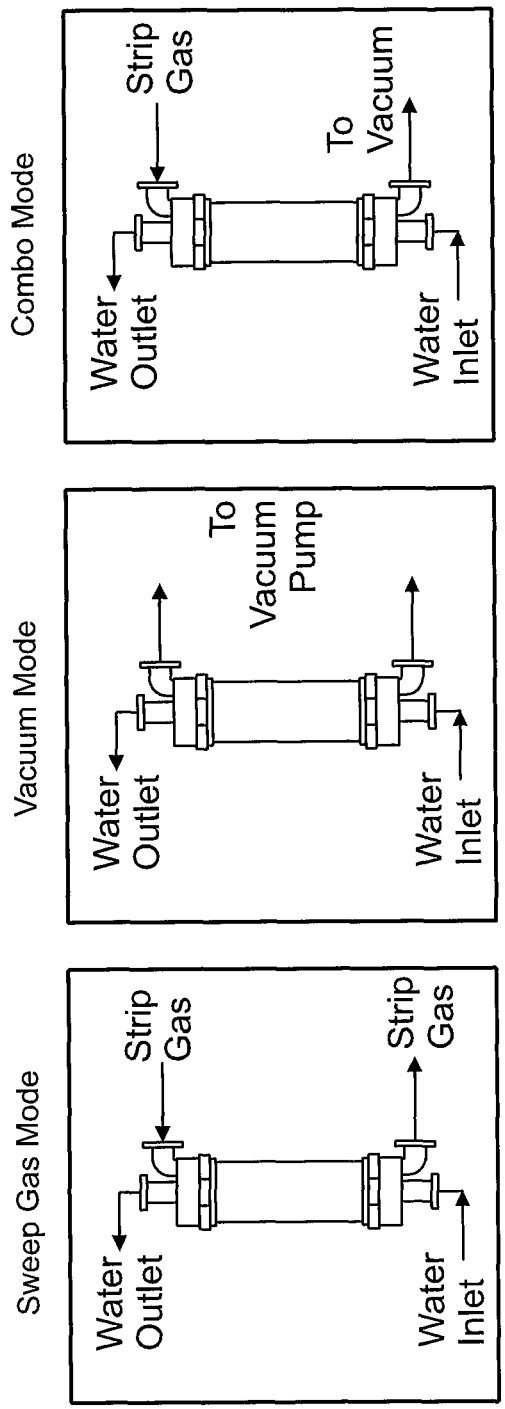
FIGS. 30, 31 and 32 are schematic illustrations of use of modules in respective exemplary Sweep Gas Mode, Vacuum Mode, and Combo Mode.

FIGS. 30, 31 and 32 illustrate various uses or modes of modules or contactors (Sweep Gas, Vacuum, and both).

Figure 33:
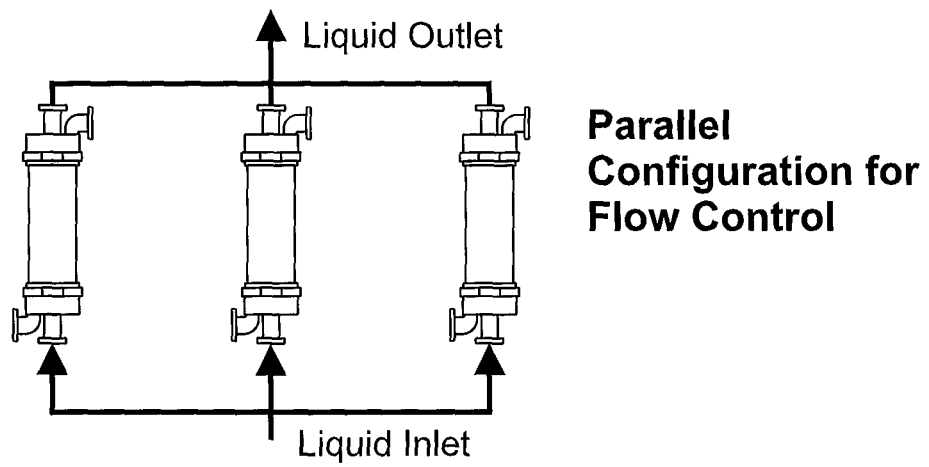
FIGS. 33 and 34 are schematic illustrations of respective exemplary parallel and series contactor configurations.
Figure 34:
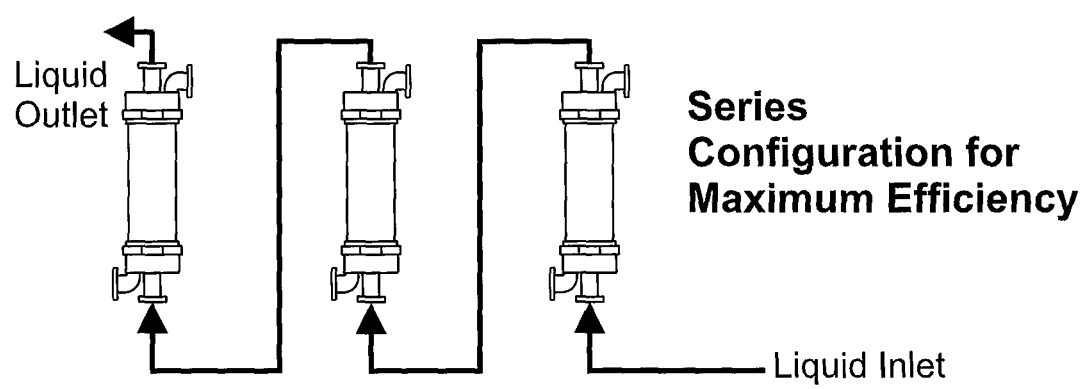

FIGS. 33 and 34 show respective parallel and series contactor configurations.

Figure 35:
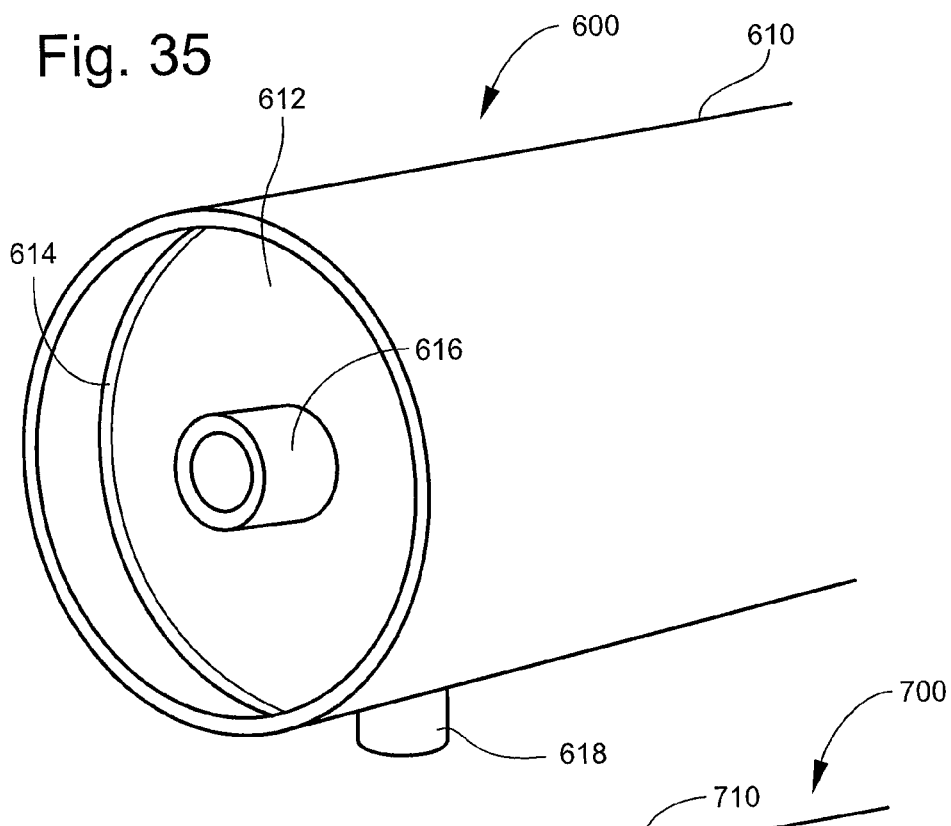
FIGS. 35 and 36 are respective schematic partial perspective view illustrations of selected exemplary liquid and gas port configurations of respective exemplary side and end gas port embodiments in accordance with the present invention.

FIG. 35 shows a side gas port configuration module 600 with a side gas port arrangement of at least one embodiment of the instant invention. The module 600 has a housing 610, an end cap 612, an end cap lock 614, an end port 616, and a side port 618.

Figure 36:
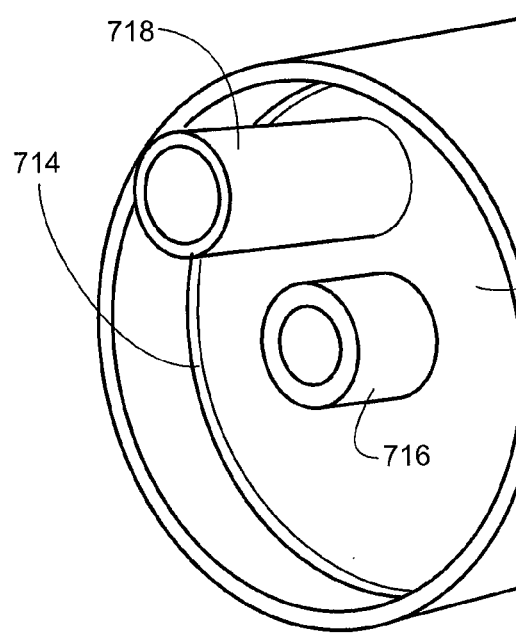

FIG. 36 shows a preferred end gas port module 700 with an end gas port arrangement of at least one embodiment of the instant invention. The module 700 has a housing 710, an end cap 712, an end cap lock 714, an end port 716, and an end gas port 718.

Figure 37:
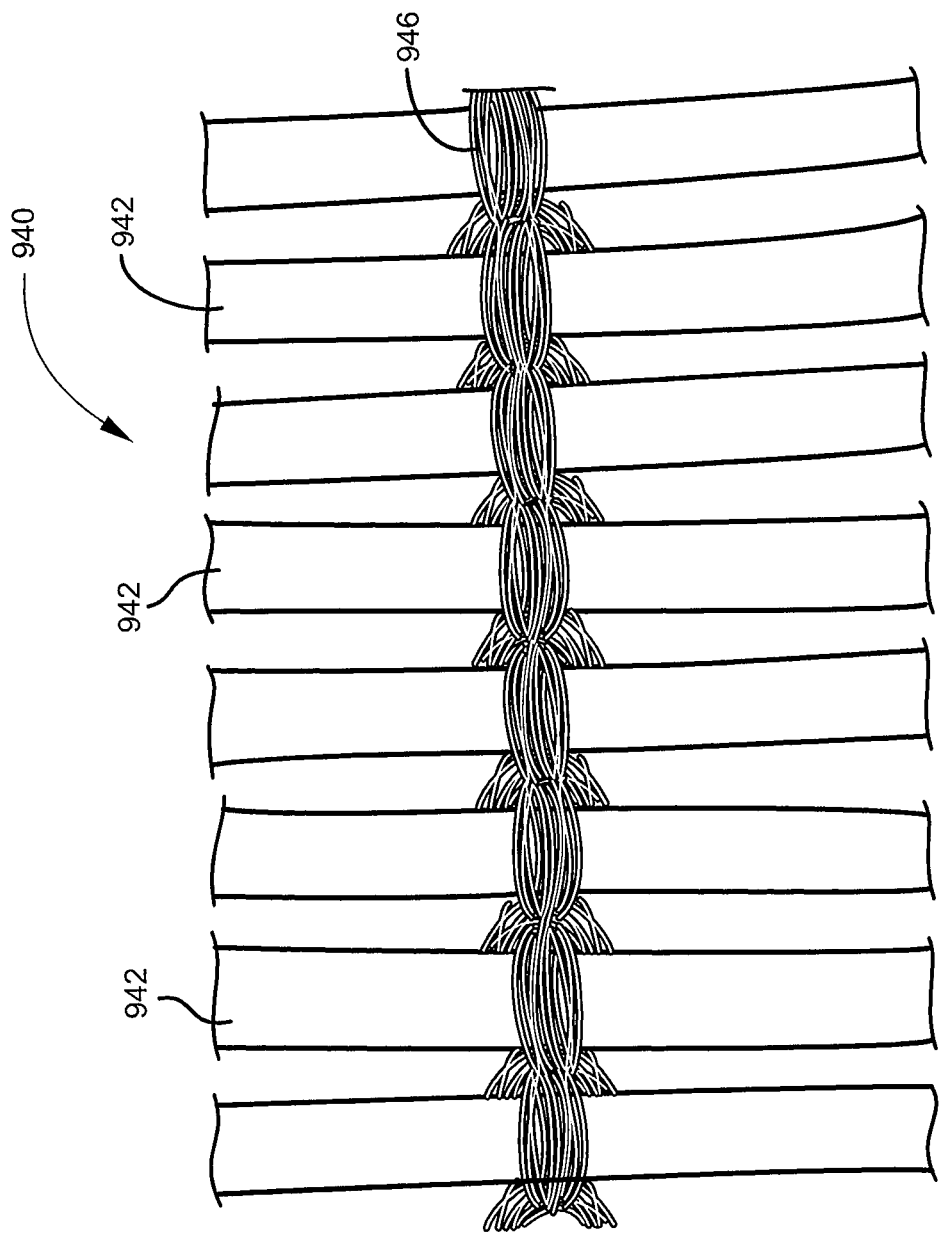
FIG. 37 is a schematic highly magnified surface view of an example of a hollow fiber membrane array.

As schematically shown in FIG. 37, the preferred hollow fiber membrane array 940 includes a plurality of hollow fibers 942, for example, Celgard® X-40 hollow fibers, connected by cross threads 946, for example, polypropylene thread, spaced along their length. Example hollow fibers may have an outer diameter of about 300 μm.

Figure 38:
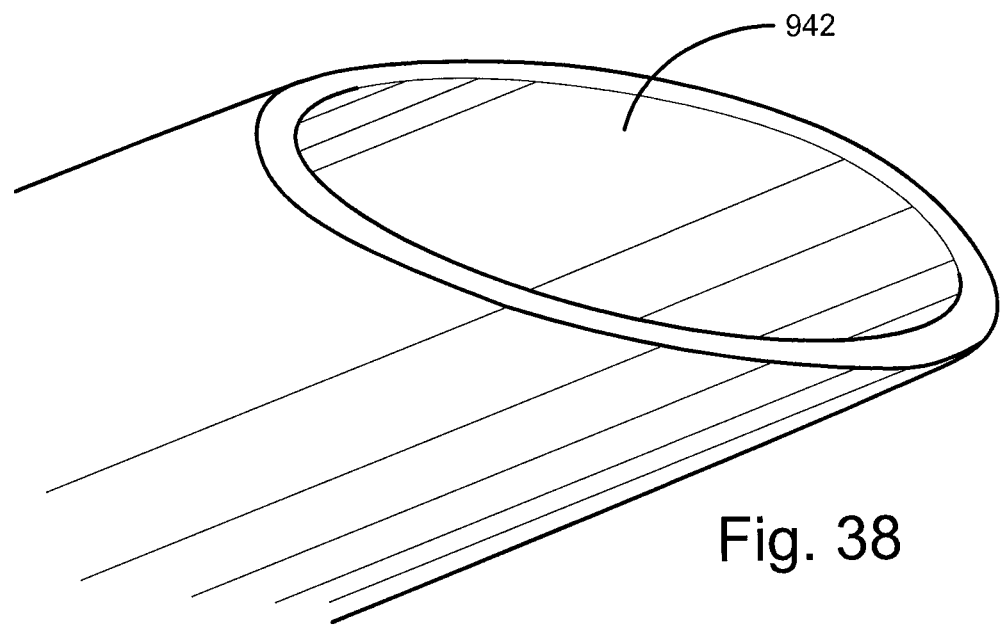
FIG. 38 is a schematic perspective end view of a hollow fiber membrane like one from FIG. 37.

In FIG. 38, one such hollow fiber 942 may have, for example, an outer diameter of about 300 μm and an inner diameter of about 200 to 220 μm.

Figure 39:
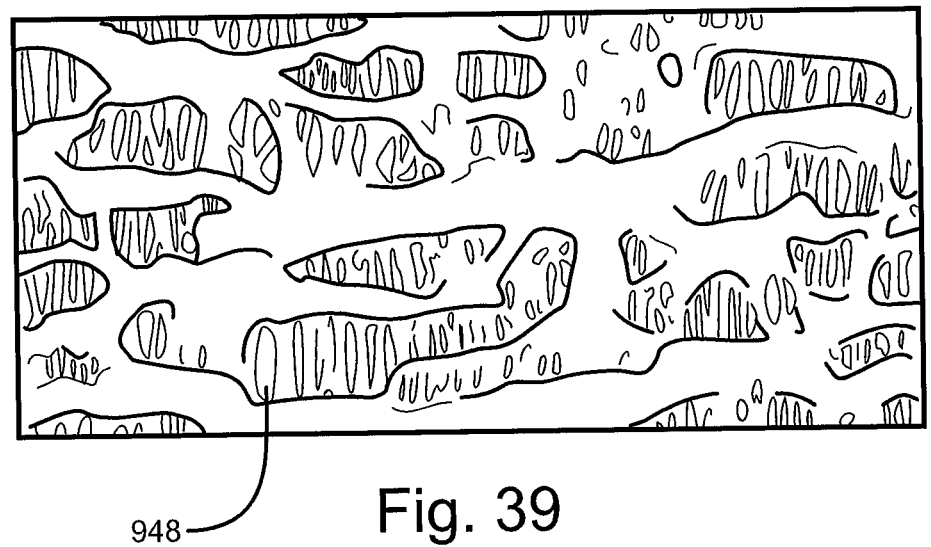
FIG. 39 is a schematic enlarged surface view of a portion of the exterior (shell side) of the hollow fiber of FIG. 38.

As shown in FIG. 39, the preferred hollow fiber 942 has slit-like micro pores 948 with, for example, an average pore size of 0.03 μm. Such hollow fibers may be polypropylene and made by an environmentally friendly dry stretch process.

Figure 40:
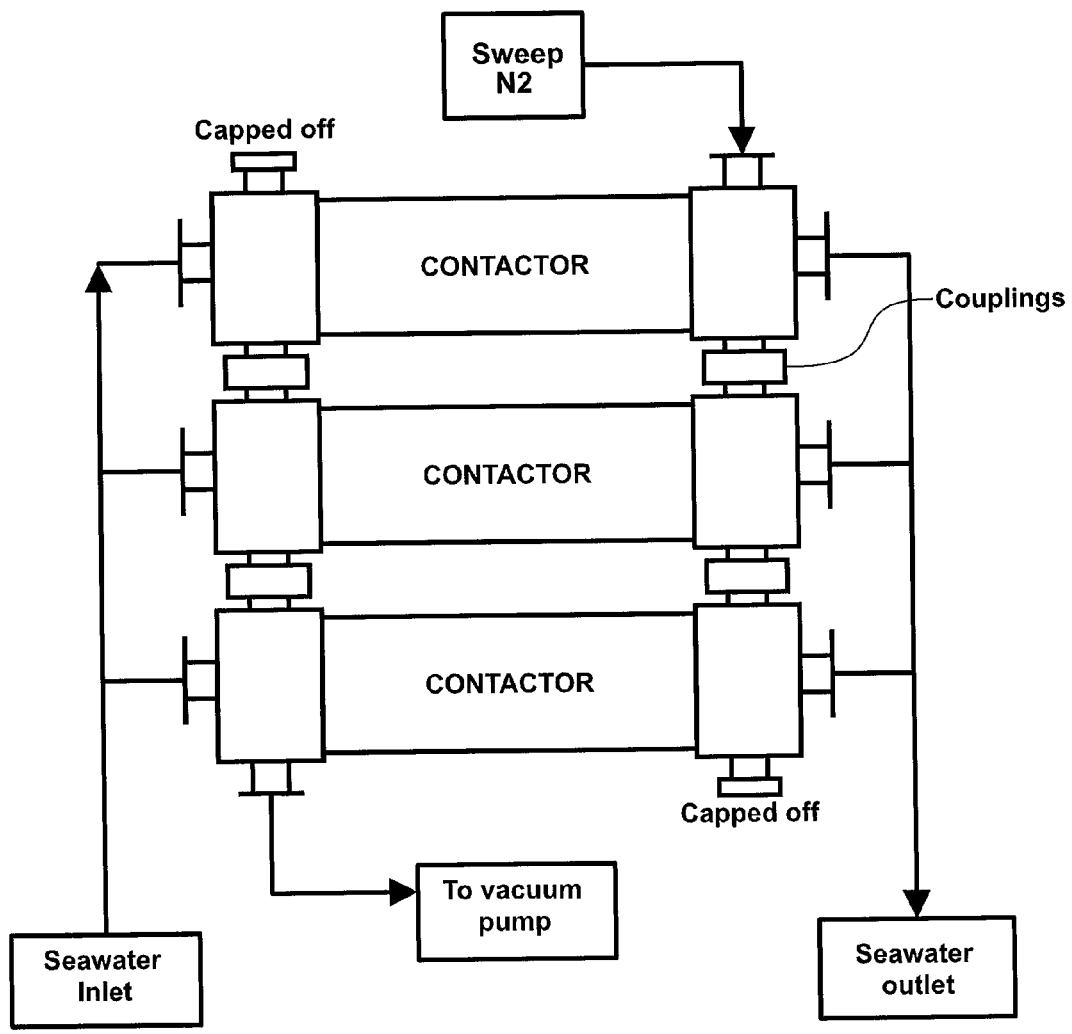
FIG. 40 is a schematic illustration of a particular exemplary multiple contactor configuration or contactor array in accordance with at least one embodiment of the present invention; and, FIGS. 41 and 42 are schematic exemplary data sheets of one particular example of a module or contactor of at least one embodiment of the instant invention.
Figure 41:
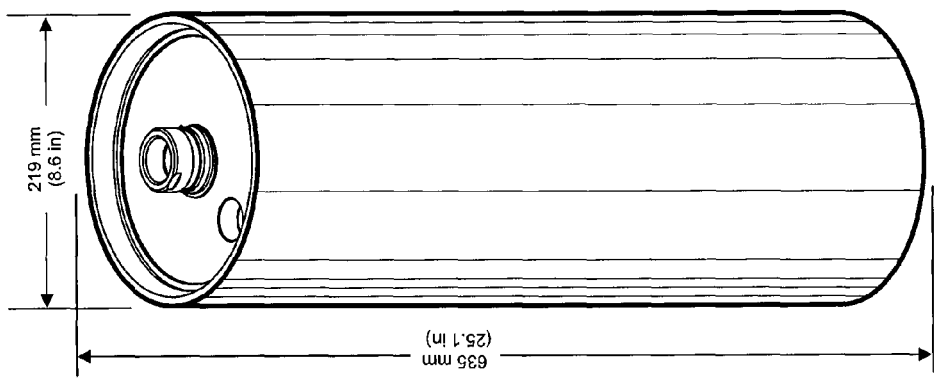
Figure 42:
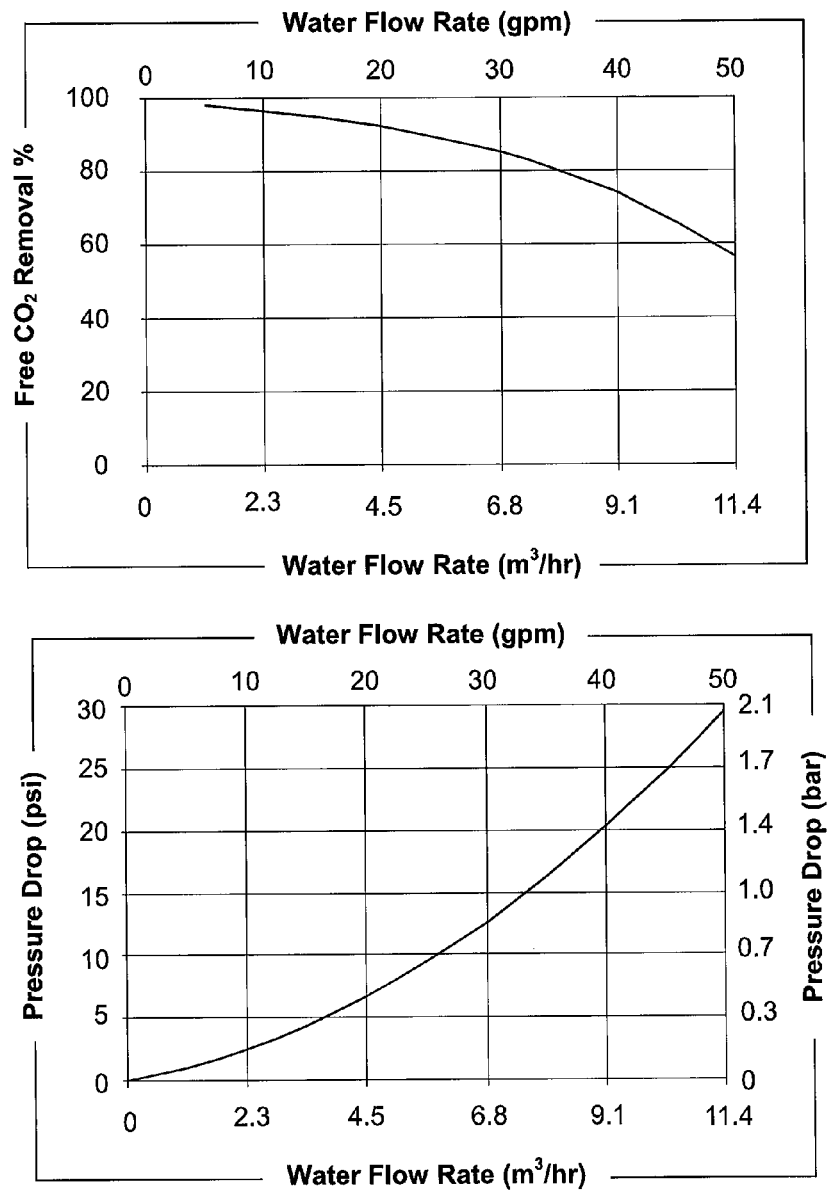

FIG. 40 illustrates a preferred particular multiple contactor configuration or array in accordance with at least one embodiment of the present invention. This particular configuration is especially well suited for degassing water using modules or contactors and $N_2$ sweep gas and vacuum combination (Combo Mode). Although only three contactors are shown, it is understood that more or fewer contactors may be used. In accordance with a particular aspect of the present invention, this particular configuration is especially well suited for replacing or augmenting a conventional vacuum tower. For example, using multiple degassing modules or contactors (preferably with non-metallic housings) and $N_2$ sweep gas and vacuum in this particular configuration can easily produce degassed water.

Although the particular gas port or port seal design is not limited, the preferred is a gas port seal design that will work with both positive and negative pressures.

Some of the polymer components may be selected from, for example, polyvinyl chloride (PVC), chlorinated polyvinyl chloride (CPVC), high impact polystyrene (HIPS), polyacrylonitrile-butadi-ene-styrene (ABS), polyacrylate-styrene-acrlonitrile (ASA), and polycarbonate (PC).

In accordance with at least one example, the preferred materials for each of the major components is as follows:
Module Housing—PVC, ABS, polyethylene, steel, stainless steel (SS) . . . anything that will bond with epoxy
Center Tube—ABS, PVC
Center Tube Connector—ABS, PVC
Shell Side End Port or Nozzle (liquid port)—Noryl, ABS, Delrin (Acetal), steel, SS
Lumen Side End Port (gas port)—1" threaded pipe (PVC, ABS, steel, SS)
End Cap—Delrin, PVC, ABS, CPVC, FRP, SS, Noryl, steel
Thread for hollow fiber array—PP
Hollow Fiber—Celgard X-40 PP
Potting—Epoxy, thermoplastic According to at least one inverted potting embodiment, the hollow fiber mats are embedded/potted in a resin by the following method: A staple of hollow fiber mats is introduced into a housing. In a first step, a plunger or plug is placed in one end of the housing and then fugitive or removable liquid or gel is introduced into the housing via the openings while the housing is spinning around its central axis. As a result, the fugitive or removable liquid or gel forms a layer into which the ends of the hollow fibers are embedded. In a second step a liquid hardenable resin is introduced into the housing and by the centrifugal effect forms a resin layer over the first layer of the fugitive or removable liquid or gel, such that the hollow fibers are embedded in the resin layer in a segment along the fiber length nearby the fiber ends. After hardening of the resin, the fugitive or removable liquid or gel and the plug are removed and the hollow fibers are embedded in the hardened resin such that the fibers extend with their ends beyond the resin layer. Then, the fiber ends are trimmed to form the recessed tube sheet with open ends of the fibers on the outer surface. This process is repeated for the other recessed tube sheet.

Potting or thermosetting materials may include, but are not limited to, epoxy, polyurethane, and thermoplastics. Epoxies are preferred. Thermoplastics, as used herein, refers to a high polymer that softens when exposed to heat and returns to its original condition when cooled to room temperature; the term is usually applied to synthetics such as polyvinyl chloride, nylons, fluorocarbon polymers, linear polyethylene, polyurethane prepolymer, polystyrene, polypropylene, and cellulosic and acrylic resins. Exemplary thermoplastics include polyolefins, such as polypropylene and polyethylene.

Different potting methods may be employed to form the potting or tube sheets. Such different potting methods include, but are not limited to, mold potting, centrifugal potting, and gravity potting.

In at least certain embodiments, the present invention is directed to contactors, modules, systems, and/or methods of degassing liquids. In at least particular possibly preferred embodiments, the contactor or module is integrally potted, has planar, disc shaped end caps, and a cylindrical housing or shell receiving and supporting a membrane structure. In at least particular possibly preferred embodiments, each of the planar disc shaped end caps has a central opening therein adapted to receive a liquid end port or nozzle, another opening therein adapted to receive a gas end port or threaded pipe, and is held in place in the housing or shell by at least one retaining element such as a retaining or locking ring. In at least particular possibly preferred embodiments, the integrally potted membrane structure is potted in place in the housing or shell by an inverted potting process involving the use of a removable plunger or plug to recess the potting.

The instant application relates to membrane contactors or modules and their methods of manufacture and use. In at least selected embodiments, the present invention is directed to liquid degassing membrane contactors or modules and/or their methods of manufacture and/or use. In at least certain embodiments, the present invention is directed to contactors, modules, systems, and/or methods of degassing liquids having entrained or dissolved gases with one or more hollow fiber membrane contactors or modules. In at least particular possibly preferred embodiments, the contactor or module is integrally potted, has planar, disc shaped end caps, and a high pressure cylindrical housing or shell receiving and supporting a membrane element or structure including a perforated core, a plurality of hollow fiber membranes, a tube sheet or potting affixing each end of the hollow fibers and adhering to the interior of the housing or shell. In at least particular possibly preferred embodiments, each of the planar disc shaped end caps has a central opening therein adapted to receive a liquid end port or nozzle, another opening therein adapted to receive a gas end port or nozzle, and is adapted to be held in place in the cylindrical housing or shell by at least one retaining element such as a retaining or locking ring received in a groove in the interior of the cylindrical housing or shell. In at least particular possibly preferred embodiments, the integrally potted membrane structure is potted in place in the housing or shell by an inverted potting process involving the use of a removable plunger or plug to provide recessed potting and by trimming the end of the potting and opening the ends of the hollow fibers preferably using an internal lathe means (which can preferably reach into the housing to trim the recessed potting or tube sheet), and may also include machining or forming a larger diameter section for receiving the end cap, a groove for receiving the retaining ring, and a flared entrance for facilitating the insertion of the end cap and retaining ring preferably using an internal lathe means.

In at least particular possibly preferred embodiments, the contactor housing, shell, casing, or body is selected from standard PVC, CPVC, ABS, polypropylene, steel, or stainless steel pipe (preferably a pipe material that will bond with epoxy to facilitate integral potting), such as 1" to 24" (nominal pipe size)(nominal diameter) standard PVC, ABS, steel, or stainless steel pipe, preferably 2" to 24" (nominal pipe size) Schedule 80 PVC pipe or 2" to 24" (nominal pipe size) Schedule 40 PVC pipe, more preferably 4" to 20" (nominal pipe size) Schedule 80 gray PVC pipe, and most preferably 6" to 18" (nominal pipe size) Schedule 80 gray PVC pipe.

At least certain prior membrane cartridges were formed or machined to have tube sheets or hollow fibers which ended flush with the end of the cartridge. In contrast, at least selected possibly preferred embodiments of the present invention have potting, tube sheets and/or hollow fibers which end deeply recessed in the module housing (for example, a recess of at least 1", preferably at least 2", and more preferably 3" or more in for example an 8" nominal diameter Schedule 80 PVC pipe or housing). In accordance with at least selected possibly preferred embodiments, the deeply recessed potting, tube sheets and/or hollow fibers are trimmed or cut using an internal trimming or cutting means such as an internal lathe that can reach up into the housing (for example, a recess of at least 1", preferably at least 2", and more preferably 3" or more in for example an 8" nominal diameter Schedule 80 PVC pipe as the housing). In accordance with at least one possibly preferred embodiment of the present invention, the potting, tube sheets, and/or hollow fibers are deeply recessed in the housing by numerically controlled (NC) lathe machining such as lathe finish cutting with tapered blades.

In accordance with at least selected particular possibly preferred embodiments of the present invention, the housing is a machined or modified 1" to 24" (nominal pipe size) (nominal diameter) standard PVC, ABS, steel, or stainless steel pipe, preferably 2" to 24" (nominal pipe size) Schedule 80 PVC pipe or 2" to 24" (nominal pipe size) Schedule 40 PVC pipe, more preferably 4" to 20" (nominal pipe size) Schedule 80 gray PVC pipe, still more preferably 6" to 18" (nominal pipe size) Schedule 80 gray PVC pipe, and most preferably an about 8" nominal pipe size Schedule 80 PVC pipe, the membrane is preferably integrally potted in the housing an inverted potting technique so the potting is recessed in the housing, the potting is preferably machined deeply recessed in the housing by, for example, numerically controlled (NC) lathe machining (preferably with no initial rough cut or additional finish cut operation), the contactor or module length is preferably easily shortened or extended by selecting shorter or longer housing lengths (for example with an 8" nominal diameter Schedule 80 PVC pipe as the housing, the housing length may be selected to be about 10" to 60", preferably about 20" to 50", more preferably about 24" to 36"), the end caps are preferably planar, disc shaped end caps or plates that fit inside the housing, and/or the end caps are preferably pressed into place and held in position with retaining rings (no bolts or v-band clamps needed) and may be press installed with an Arbor Press.

In accordance with at least selected embodiments of the present invention, it is preferred that the liquid degassing contactor operate, for example, at shellside liquid pressures of about 5 to 200 psig, preferably 10 to 100 psig, more preferably 10 to 90 psig, and most preferably 10 to 60 psig, and at lumenside gas vacuum or pressures of minus 14.7 psig to about positive 60 psig, preferably minus 14.7 psig to positive 30 psig, more preferably minus 10 psig to positive 15 psig, most preferably at about a minus 5 psig (to clarify terminology: psi=pounds per square inch, psig=pounds per square inch gauge, psia=pounds per square inch absolute, psig=psia+14.7 psi, 14.7 psia=normal atmospheric pressure, −14.7 psig=0 psia=lowest possible negative pressure or absolute vacuum).

In at least selected embodiments, the present invention is directed to high pressure liquid degassing membrane contactors and/or their methods of manufacture and/or use. In at least certain embodiments, the present invention is directed to degassing a high pressure liquid having one or more entrained or dissolved gases with a hollow fiber membrane contactor. Preferably, the contactor has a high pressure housing, casing or shell enclosing at least one membrane element or structure, preferably an integrally potted shell side liquid, baffled membrane element, including a perforated core, a plurality of hollow fiber membranes, a tube sheet affixing each end of the hollow fibers to the cylindrical housing, shell or casing. More preferably, lumens of the hollow fibers are in fluid communication with a sweep gas (a strip gas), a vacuum, or both, and the liquid to be degassed (or debubbled) enters the contactor via an open end of the perforated core and radially exits through the core perforations, crosses over the exterior of the hollow fibers (the shell side or shellside), optionally passes over at least one baffle and crosses over the exterior of another portion of the hollow fibers, returns to the core through the perforations, and exits the contactor with less dissolved or entrained gas. The entrained or dissolved gas diffuses or passes from the liquid across the hollow fiber membrane and into the lumen.

In at least selected embodiments, the present invention is directed to high pressure liquid degassing membrane contactors having high pressure housings or shells that are preferably selected from desired lengths of standard PVC, ABS, polypropylene, steel, or stainless steel pipe (preferably a pipe material that will bond with epoxy to facilitate integral potting), such as 1" to 24" (nominal pipe size)(nominal diameter) standard PVC, ABS, steel, or stainless steel pipe, preferably 2" to 24" (nominal pipe size) Schedule 80 PVC pipe or 2" to 24" (nominal pipe size) Schedule 40 PVC pipe, more preferably 4" to 20" (nominal pipe size) Schedule 80 gray PVC pipe, and most preferably 6" to 18" (nominal pipe size) Schedule 80 gray PVC pipe. Such pipe section housings are preferably machined or modified to receive end caps and retaining rings. The end caps preferably include both liquid and gas (or permeate) end ports or nozzles with the liquid ports or nozzles preferably adapted to operate under pressure and the permeate or gas ports preferably adapted to function under vacuum or reduced pressure conditions.

In at least selected embodiments, the present invention is directed to improved, unique and/or low cost liquid degassing membrane contactors, modules or systems, their methods of manufacture, and/or methods of use thereof. In at least certain embodiments, the present invention is directed to membrane treatment of fluids such as gasifying or degassing (or debubbling) a liquid having a dissolved or entrained gas or gases with a membrane contactor or module. Preferably, the contactor has a pressure housing enclosing at least one membrane structure, element or unit preferably including a perforated core, a plurality of hollow fiber membranes, a tube sheet affixing each end of said hollow fibers, and an optional baffle. Preferably, the membrane structure is a shell side liquid degassing structure in which the hollow fiber lumens are in fluid communication with a sweep gas, a vacuum, or both, and the liquid to be degassed enters the contactor via an open end of the perforated core, radially exits the core perforations, crosses over the exterior (lumenside) of the membranes within the housing, and exits the contactor with less dissolved or entrained gas. The dissolved gas preferably diffuses from the liquid across the microporous membrane into the lumen.

In at least one embodiment, a possibly preferred membrane structure is integrally potted and includes a perforated center tube, a membrane mat comprising a plurality of one or more types of hollow fiber membranes each having a first end and a second end both being open, an optional baffle separating the hollow fiber mat into two areas, and potting at each end. The first and second membrane ends are open, for example, to allow strip or sweep gas to pass there through. It may be preferred that the baffle is formed of a center tube plug of a one piece center tube or of at least one connector joining at least first and second sections of a multi-piece center tube and by epoxy that is applied over the center tube connector in the mat or bundle, preferably the center of the mat or bundle, while winding thereby forming a dam or block through at least a portion, preferably substantially the entire thickness, of the hollow fiber mat. It may also be preferred that the potting be made of epoxy and that the ends of the potting be cut off to form the open first and second ends (tube sheets) following potting.

In accordance with at least one embodiment, the center tube forms an axial opening in each end of the membrane structure and is perforated along its length to provide radial openings for liquid to flow out through the perforations and over the hollow fibers. The axial opening in each end of the membrane structure is adapted to be in fluid communication with the liquid ports or nozzles in the end caps of the module. For example, a respective elongate nozzle may be used to connect the corresponding axial opening with the liquid supply.

In accordance with one possibly preferred aspect of the present invention, there is provided a commercially viable liquid degassing contactor having a cylindrical housing or shell and at least one integrally potted membrane structure therein.

In accordance with another possibly preferred aspect of the present invention, there is provided a commercially viable liquid degassing contactor having a housing made of a length or section of modified standard pipe adapted to receive an end cap in each end thereof.

In accordance with yet another possibly preferred aspect of the present invention, there is provided a commercially viable liquid degassing contactor having an integrally potted membrane structure with deeply recessed tube sheets in a cylindrical housing or shell.

In accordance with still yet another possibly preferred aspect of the present invention, it was discovered that a commercially viable, high pressure liquid degassing contactor could be constructed using a desired length of standard PVC, ABS, steel, or stainless steel pipe modified to receive and retain end caps therein.

The possibly preferred membrane contactors of the present invention may make it possible to transfer gas to or from an aqueous stream without dispersion. Such membrane contactors may contain thousands of Celgard® microporous polyolefin, for example, hydrophobic polypropylene, hollow fibers knitted into an array using polypropylene thread (see FIG. 37) that is wound around a distribution tube and collection tube (respective portions of a perforated center tube). The hollow fibers are preferably arranged in a uniform open packing, allowing greater flow capacity and utilization of the total membrane surface area. Because the hollow fiber membrane is preferably hydrophobic, the aqueous stream will not penetrate the pores. The gas/liquid interface is immobilized at the pore by applying a higher pressure to the aqueous stream relative to the gas stream. Unlike dispersed-phase contactors such as packed columns, the present possibly preferred membrane contactors provide a constant interfacial area for transfer over the entire operating range of flow rates.

The possibly preferred membrane contactors of the present invention may include a bundle of microporous hollow fibers, a rigid shell or housing enclosing the fiber bundle, and an end cap at each end of the housing. The end caps may be provided with four fluid ports: an inlet for introducing the first fluid, an outlet for discharging the first fluid, an inlet for introducing the second fluid, and an outlet for discharging the second fluid. The hollow fibers may be potted on both ends, recessed within the housing, to form polymeric tube sheets with the fiber bores opening on each end into common first and second end cap portions of the contactor. Although not preferred, in a "tube-side" or "lumen-side" type contactor, the first end cap may contain the inlet for the first fluid, which is designated the "tube-side" or "lumen-side" fluid because it is the fluid that passes through the internal lumens of the fibers. The second end cap contains the outlet for discharging the lumen-side fluid. The second fluid, designated the "shell-side" fluid, typically enters and exits the housing through inlet and outlet ports arranged between the tube sheets, whereby the shell-side fluid contacts the external surfaces of the fibers. The shell-side fluid flows through the interstices between fibers of the fiber bundle, and may be directed to flow parallel or perpendicular to the fiber length.

In the preferred "shell-side" contactor, the contactor may include a central core which passes through the membrane structure and has a first end serving as the inlet for the first fluid, which is designated the "shell-side" fluid because it is the fluid that passes over the exterior or shell of the hollow fibers. The first end cap may contain the inlet or port for the second fluid, which is designated the "tube-side" or "lumen-side" fluid because it is the fluid that passes through the internal lumens of the fibers. The second end cap contains the outlet for discharging the lumen-side fluid. The first fluid, designated the "shell-side" fluid, may enter and exit the end caps via respective inlet and outlet ports or nozzles operatively connected to the open ends of the perforated core, and typically exits and re-enters the perforations in the core between the tube sheets whereby the shell-side fluid contacts the external surfaces of the fibers. The shell-side fluid flows through the interstices between fibers of the fiber bundle, and may be directed to flow parallel and/or perpendicular to the fiber length.

Because the tube sheets separate the lumen-side fluid from the shell-side fluid, the lumen-side fluid does not mix with the shell-side fluid, and typically the only transfer between the lumen-side fluid and the shell-side fluid occurs through the walls of the hollow fibers. The fine pores in the fiber wall are normally filled with a stationary layer of one of the two fluids, the other fluid being excluded from the pores due to surface tension and/or pressure differential effects. Mass transfer and separation are usually caused by diffusion, which is driven by the difference in concentration of the transferring species between the two phases. Typically, no convective or bulk flow occurs across the membrane.

The hollow fibers are preferably made of polyolefin materials such as polypropylene and may also be made of polymethyl pentene (PMP, or poly(4-methyl-1-pentene)), polyvinylidene fluoride (PVDF), microporous hydrophobic PVDF, copolymers of polyvinylidene fluoride, such as a copolymer of polyvinylidene fluoride and hexafluoropropylene (PVDF: HFP), other polyolefins (e.g., polyethylene, polybutene), polysulfones (e.g., polysulfone, polyethersulfone, polyarylsulfone), cellulose and its derivations, poly phenyl oxide (PPO), PFAA, PTFE, other fluorinated polymers, polyamides, polyether imides (PEI), polyimides, polyamideimides (PAI), combinations, blends or copolymers thereof, and/or the like.

Although the possibly preferred present membrane contactors utilize a microporous membrane, the separation principle differs substantially from other membrane separations such as filtration and gas separation. With such preferred hollow fiber membrane contactors, there is no convective flow through the pores as occurs in other membrane separations. Instead, the preferred membrane acts as an inert support that brings the liquid and gas phases in direct contact without dispersion. The mass transfer between the two phases is governed entirely by the pressure of the gas phase. Because of the preferred Celgard® hollow fibers and the contactor geometry, the surface area per unit volume is an order of magnitude higher than traditional technologies such as packed columns, forced draft deaerators and vacuum towers. This high level of surface area to volume leads to a dramatic reduction in contactor/system size for a given level of performance.

It is noted that although the baffled membrane design appears to be preferred, there appear to be three design variants for the presently described membrane contactors. The baffled membrane design uses a radial liquid flow path around a central baffle. Liquid flows on the outside (shell side or shellside) of the hollow fibers. The NB, or No Baffle design, does not utilize a central baffle, but it is still a radial flow device. The liquid outlet port on the no baffle design is located in the middle of the device rather than at the contactor ends as in the baffled design. One end of the NB contactor is capped and allows liquid to flow outward or radially across the fibers from a central distribution tube. This variant appears best suited for vacuum operation. The third variant or design allows for liquid flow inside of the hollow fiber (lumen side or lumenside). These devices are not radial flow devices and appear best suited for small flow applications.

The present possibly preferred membrane contactors may utilize one of several fiber types, such as PP, PMP, or PVDF, which may be well suited for absorption/stripping techniques for water. PVDF fibers may better handle sanitizers added to seawater. The Celgard® X-40 membrane has a thicker wall with a smaller inside diameter than the X-50 and is recommended for oxygen removal. The Celgard® X-50 membrane has a slightly thinner wall with a larger inside diameter. (see FIGS. 38 and 39) This feature allows for greater carbon dioxide removal as compared to the X-40 membrane.

Below is a comparison of the Celgard® X-40 and X-50 hollow fibers.

TABLE 1

Celgard ® X-40 and X-50 Hollow Fiber Comparison

| | | Fiber Type | |
| --- | --- | --- | --- |
| Characteristic | Units | X-40 | X-50 |
| Fiber OD (nominal) | Microns | 300 | 300 |
| Fiber ID (nominal) | Microns | 200 | 220 |
| Bubble Point | psi | 240 | 240 |
| Load at Break | grams | 430 | 430 |
| Porosity | % | 25 | 40 |
| Average Pore Size | Microns | 0.03 | 0.04 |

A possible third fiber variant, a microporous polyolefin, was introduced in smaller contactors for gas transfer of low surface tension fluids and the fluid always flows on the shell side in these devices. Furthermore, a microporous PVDF fiber has been introduced for better tolerance of oxidizing species in water. Additionally, an XIND fiber was introduced in larger industrial contactors, and is geared to non-FDA degassing applications.

When using the Baffled or No-Baffle Membrane Contactors in gas absorption applications such as aeration or carbonation, etc., a gas is introduced into the inside (lumen side) of the hollow fiber membrane and the liquid phase is introduced to the outside (shell side) of the hollow fiber. The partial pressure of the gas and the water temperature controls the amount of gas dissolved in the liquid phase. When using Lumen Side Liquid membrane contactors (non radial flow devices) in this application, the liquid is introduced to the lumen side while the gas is introduced to the shell side.

When using the Baffled or No Baffle Membrane Contactors in gas stripping applications such as decarbonation or deoxygenation, a vacuum or stripping gas or combination of those is applied to the lumen side of the hollow fiber. The liquid stream is introduced to the outside of the fiber. The partial pressure of the gas is decreased to remove dissolved gases from the liquid phase. When using Lumen Side Liquid membrane contactors (non radial flow devices) in this application, the liquid is introduced to the lumen side while the gas/vacuum is applied to the shell side.

In accordance with at least selected embodiments, objects, examples or aspects, the present invention is directed to or provides liquid degassing membrane contactors, components, systems, and/or their methods of manufacture and/or methods of use thereof.

In accordance with at least certain embodiments, objects, examples or aspects, the present invention is directed to or provides membrane contactors, modules, and/or systems and/or their methods of manufacture and/or use including degassing liquids.

In accordance with at least certain embodiments, objects, examples or aspects, the present invention is directed to or provides the following:

A liquid degassing membrane contactor or module comprising:
an integrally potted membrane structure in a cylindrical housing with the ends of the membrane structure recessed in the housing.

A liquid degassing membrane contactor or module comprising:
planar, disc shaped end caps having liquid and gas ports therein.

A liquid degassing membrane contactor or module comprising:
an integrally potted membrane structure in a cylindrical housing with the ends of the membrane structure recessed in the housing, the membrane structure including a perforated core, a plurality of hollow fiber membranes, a tube sheet or potting affixing each end of the hollow fibers and adhering to the interior of the housing or shell.

A liquid degassing membrane contactor or module comprising:
planar, disc shaped end caps having liquid and gas ports therein, each of the planar disc shaped end caps has a central opening therein adapted to receive a liquid end port or nozzle, another opening therein adapted to receive a gas end port or pipe, and is adapted to be held in place in said cylindrical housing or shell by at least one retaining element such as a retaining or locking ring received in a groove in the interior of the cylindrical housing or shell.

A liquid degassing membrane contactor or module comprising:
an integrally potted membrane structure potted in place in a housing or shell by an inverted potting process involving the use of a removable plunger or plug and trimming the ends of the potting and opening the ends of the hollow fibers preferably using an internal lathe means.

A liquid degassing membrane contactor or module comprising:
a modified section of pipe including a larger diameter section for receiving an end cap, a groove for receiving a retaining ring, and a flared entrance for facilitating the insertion of the end cap and retaining ring, preferably modified using an internal lathe means.

A liquid degassing membrane contactor or module comprising:
a contactor housing, shell, casing, or body selected from standard PVC, ABS, polypropylene, steel, or stainless steel pipe (preferably a pipe material that will bond with epoxy to facilitate integral potting), such as 1" to 24" (nominal pipe size)(nominal diameter) standard PVC, ABS, steel, or stainless steel pipe, preferably 2" to 24" (nominal pipe size) Schedule 80 PVC pipe or 2" to 24" (nominal pipe size) Schedule 40 PVC pipe, more preferably 4" to 20" (nominal pipe size) Schedule 80 gray PVC pipe, and most preferably 6" to 18" (nominal pipe size) Schedule 80 gray PVC pipe.

A spiral-type hollow fiber membrane fabric-containing module or contactor, comprising:
a module housing made of a modified section of pipe;
a pair of end caps adapted to fit in the ends of said module housing;
liquid end ports in each of said end caps;
at least one gas port in at least one of said end caps or in the side of said module housing near one end thereof;
at least one membrane structure adapted to fit in said module housing, each membrane structure comprising:
a. a plurality of hollow fiber membranes each having a lumen, said membranes being formed into a fabric-like array in which the hollow fibers substantially are mutually-parallel and constitute the fabric weft, and are held in spaced-apart relationship by filaments constituting the fabric warp;
b. the array being wound upon an axis which is substantially parallel to the hollow fibers into a spirally-wound membrane bundle having two bundle ends and a cylindrical exterior surface;
c. each of the two bundle ends being potted in resinous potting material serving to seal the bundle end into an adjacent monolithic tube sheet, a portion of the bundle between the two tube sheets being free from potting material to form a shell-side region, and the lumen ends of the hollow fibers constituting a first one of the bundle ends being exposed and communicating with the exterior of the bundle;
d. the module shell, casing or housing having first and second housing ends and a cylindrical housing interior and being suitably shaped to contain the membrane bundle, the tube sheet (potting) recessed relative to the first housing end sealing the first bundle end to the cylindrical housing interior, said module housing which contains the bundle defining two regions mutually communicating through the membrane including (i) a shell-side space exterior to the portion of the bundle between the tube sheets and within the housing, and (ii) a lumen-side space including the hollow fiber lumens and the first bundle end;
wherein an interior face of a first of said end caps and an interior of said module housing adjacent the first tube sheet, together with the cylindrical housing interior and the first bundle end, seal a first module housing end and define a first chamber communicating with the membrane lumens;
wherein an interior face of a second of said end caps and an interior of said module housing adjacent a second tube sheet recessed from the second housing end, together with the cylindrical housing interior and a second bundle end, seal a second module housing end and define a second chamber communicating with the membrane lumens; said liquid ends ports being operatively connected to the shell-side space of the membrane structure, and arranged to permit fluid injection and withdrawal there through; and
the at least one gas port communicating with at least one of the first and second chambers, and arranged to permit gas injection and withdrawal there through.

The above spiral-type hollow fiber membrane fabric-containing module or contactor, further comprising:
at least two gas ports with one gas port in each of at least each of said end caps or in each side of said module housing near each end thereof.

The above spiral-type hollow fiber membrane fabric-containing module or contactor, further comprising:

a hollow mandrel in each of said membrane structures having a longitudinal axis and a cylindrical exterior surface, an axial bore, and perforations along the surface which communicate with the bore.

The above high pressure spiral-type hollow fiber membrane fabric-containing module or contactor, further comprising:

both of the lumen ends of the hollow fibers are exposed and communicate with the exterior of the bundle.

The above spiral-type hollow fiber membrane fabric-containing module or contactor, further comprising:

wherein said module housing is a section or length of standard pipe.

The above spiral-type hollow fiber membrane fabric-containing module or contactor, further comprising:

wherein the standard pipe is modified to receive and retain end caps.

The above spiral-type hollow fiber membrane fabric-containing module or contactor, further comprising:

wherein the module housing and end caps will contain and restrain the membrane structure should it fail.

A system for degassing liquids, comprising: at least one of the above liquid degassing modules.

A liquid degassing membrane contactor, module, system, or method as shown or described herein.

A liquid degassing membrane contactor, module, component, system, or related method as shown or described herein.

The present invention may be embodied in other forms without departing from the spirit and the essential attributes thereof, and, accordingly, reference should be made to the appended claims, rather than to the foregoing specification, as indicated in the scope of the invention.

We claim:

1. A liquid degassing membrane contactor or module, comprising:
    a cylindrical housing or shell made of a length of modified pipe,
    at least one integrally potted hollow fiber membrane structure in said cylindrical housing with the ends of said membrane structure recessed in said housing a recess of at least 1" from each end, and
    respective disc shaped end caps adapted to be received in each open end of said housing.

2. The liquid degassing membrane contactor of claim 1, wherein said membrane structure is recessed in said housing a recess of at least 2" from each end.

3. The liquid degassing membrane contactor of claim 1, wherein said disc shaped end caps each having at least one of liquid and gas ports therein and adapted to be held in place in said cylindrical housing by at least one retaining element being a retaining or locking ring received in a groove in the interior of said cylindrical housing.

4. The liquid degassing membrane contactor of claim 1, wherein said planar disc shaped end caps each having a central opening therein adapted to receive a liquid end port or nozzle, and another opening therein adapted to receive a gas end port or pipe.

5. The liquid degassing membrane contactor of claim 1, wherein said integrally potted membrane structure including a perforated core, a plurality of hollow fiber membranes, a tube sheet or potting affixing each end of the hollow fibers and adhering to the interior of said housing.

6. The liquid degassing membrane contactor of claim 1, wherein said integrally potted membrane structure being potted in place in said housing by an inverted potting process involving the use of a removable plunger or plug and trimming the ends of the potting and opening the ends of the hollow fibers using a cutting means to produce recessed tube sheets.

7. The liquid degassing membrane contactor of claim 1, wherein said length of pipe of said cylindrical housing is formed of a modified section of pipe including in each end a larger diameter section for receiving an end cap, a groove for receiving a retaining ring, and a flared entrance for facilitating the insertion of the end cap and retaining ring.

8. The liquid degassing membrane contactor of claim 7, wherein said length of pipe is selected from standard PVC, ABS, polypropylene, steel, stainless steel, or other pipe material that will bond with epoxy to facilitate integral potting.

9. A spiral-type hollow fiber membrane fabric-containing module or contactor, comprising:
    a module housing made of a modified section of pipe;
    a pair of end caps adapted to fit in the ends of said module housing;
    liquid end ports in each of said end caps;
    at least one gas port in at least one of said end caps or in the side of said module housing near one end thereof;
    at least one membrane structure adapted to fit in said module housing, each membrane structure comprising:
    a. a plurality of hollow fiber membranes each having a lumen, said membranes being formed into a fabric-like array in which the hollow fibers substantially are mutually-parallel and constitute the fabric weft, and are held in spaced-apart relationship by filaments constituting the fabric warp;
    b. the array being wound upon an axis which is substantially parallel to the hollow fibers into a spirally-wound membrane bundle having two bundle ends and a cylindrical exterior surface;
    c. each of the two bundle ends being potted in resinous potting material serving to seal the bundle end into an adjacent monolithic tube sheet, a portion of the bundle between the two tube sheets being free from potting material to form a shell-side region, and the lumen ends of the hollow fibers constituting a first one of the bundle ends being exposed and communicating with the exterior of the bundle;
    d. the module shell, casing or housing having first and second housing ends and a cylindrical housing interior and being suitably shaped to contain the membrane bundle, the tube sheet (potting) recessed relative to the first housing end sealing the first bundle end to the cylindrical housing interior, said module housing which contains the bundle defining two regions mutually communicating through the membrane including (i) a shell-side space exterior to the portion of the bundle between the tube sheets and within the housing, and (ii) a lumen-side space including the hollow fiber lumens and the first bundle end;
    wherein an interior face of a first of said end caps and an interior of said module housing adjacent the first tube sheet, together with the cylindrical housing interior and the first bundle end, seal a first module housing end and define a first chamber communicating with the membrane lumens;
    wherein an interior face of a second of said end caps and an interior of said module housing adjacent a second tube sheet recessed from the second housing end, together with the cylindrical housing interior and a second bundle end, seal a second module housing end and define a second chamber communicating with the membrane lumens;
    said liquid ends ports being operatively connected to the shell-side space of the membrane structure, and arranged to permit fluid injection and withdrawal there through; and the at least one gas port communicating with at least one of the first and second chambers, and arranged to permit gas injection and withdrawal there through.

10. The spiral-type hollow fiber membrane fabric-containing module or contactor of claim 9, further comprising:
at least two gas ports with one gas port in each of at least each of said end caps or in each side of said module housing near each end thereof.

11. The spiral-type hollow fiber membrane fabric-containing module or contactor of claim 9, further comprising:
a hollow mandrel in each of said membrane structures having a longitudinal axis and a cylindrical exterior surface, an axial bore, and perforations along the surface which communicate with the bore.

12. The high pressure spiral-type hollow fiber membrane fabric-containing module or contactor of claim 9, further comprising:
both of the lumen ends of the hollow fibers are exposed and communicate with the exterior of the bundle.

13. The spiral-type hollow fiber membrane fabric-containing module or contactor of claim 9, further comprising:
wherein said module housing is a section or length of standard pipe modified to receive and retain end caps.

14. The spiral-type hollow fiber membrane fabric-containing module or contactor of claim 13, further comprising:
wherein the module housing and end caps will contain and restrain the membrane structure should it fail.

15. A system for degassing liquids, comprising: at least one liquid degassing module of claim 9.

16. The system for degassing liquids of claim 15, comprising: at least two liquid degassing modules of claim 9.

17. An integrally potted hollow fiber membrane contactor comprising:
planar, disc shaped end caps,
a high pressure cylindrical housing receiving and supporting a membrane element including a perforated core, a plurality of hollow fiber membranes, a tube sheet affixing each end of the hollow fibers and adhering to the interior of the housing,
each of the planar disc shaped end caps having a central opening therein adapted to receive a liquid end port, another opening therein adapted to receive a gas end port, and is adapted to be held in place in the cylindrical housing by at least one retaining element being a retaining ring received in a groove in the interior of the cylindrical housing,
the integrally potted membrane structure is potted in place in the housing by an inverted potting process involving the use of a removable plunger to provide recessed potting and by trimming the end of the potting and opening the ends of the hollow fibers using an internal lathe means, and
the housing including a larger diameter section for receiving the end cap, the groove for receiving the retaining ring, and a flared entrance for facilitating the insertion of the end cap and retaining ring.

* * * * *